(12) United States Patent
Suzuki et al.

(10) Patent No.: US 7,787,200 B2
(45) Date of Patent: Aug. 31, 2010

(54) DISK-DEVICE CORRECTING SYSTEM, INFORMATION MANAGING DEVICE, MASTER-DISK PRODUCING DEVICE, AND MASTER-DISK PRODUCING METHOD

(75) Inventors: Hiroyuki Suzuki, Kawasaki (JP); Tomoyoshi Yamada, Kawasaki (JP); Masanori Fukushi, Kawasaki (JP); Kazuhiko Takaishi, Kawasaki (JP); Tsugito Maruyama, Kawasaki (JP); Sumio Kuroda, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 1133 days.

(21) Appl. No.: 11/440,730

(22) Filed: May 25, 2006

(65) Prior Publication Data

US 2007/0195443 A1   Aug. 23, 2007

(30) Foreign Application Priority Data

Feb. 17, 2006   (JP)   ............................. 2006-041449

(51) Int. Cl.
*G11B 5/86*   (2006.01)

(52) U.S. Cl. .............................. 360/16; 360/15; 360/18; 360/48; 360/53

(58) Field of Classification Search .................. None
See application file for complete search history.

(56) References Cited

U.S. PATENT DOCUMENTS

| | | | | |
|---|---|---|---|---|
| 4,912,585 | A * | 3/1990 | Belser et al. ................ | 360/135 |
| 5,936,790 | A * | 8/1999 | Ho et al. .................. | 360/77.05 |
| 6,064,541 | A * | 5/2000 | Sasamoto et al. ........ | 360/77.05 |
| 6,166,875 | A | 12/2000 | Ueno et al. | |
| 6,304,407 | B1 | 10/2001 | Baker et al. | |
| 6,643,082 | B1 | 11/2003 | Belser | |
| 6,754,032 | B1 * | 6/2004 | Szita et al. ............... | 360/77.08 |
| 6,954,318 | B2 * | 10/2005 | Sato et al. ...................... | 360/31 |
| 6,977,785 | B2 * | 12/2005 | Nakamura et al. ............ | 360/17 |
| 7,082,008 | B2 * | 7/2006 | Ashikaga et al. ......... | 360/77.04 |
| 7,110,201 | B2 * | 9/2006 | Suzuki et al. .................. | 360/48 |
| 7,312,939 | B2 * | 12/2007 | Bandic et al. .................. | 360/15 |
| 7,471,478 | B2 * | 12/2008 | Nakao .......................... | 360/16 |
| 7,508,620 | B2 * | 3/2009 | Takaishi et al. ........... | 360/77.04 |
| 7,652,839 | B2 * | 1/2010 | Albrecht et al. ............... | 360/75 |
| 2001/0043428 | A1 | 11/2001 | Morris et al. | |
| 2002/0144114 | A1 * | 10/2002 | Barnard et al. .............. | 713/166 |
| 2002/0159173 | A1 * | 10/2002 | Ishida et al. .................. | 360/17 |
| 2002/0194568 | A1 * | 12/2002 | Kobayashi et al. .......... | 714/763 |
| 2004/0057149 | A1 * | 3/2004 | Yoshizawa et al. ............ | 360/69 |
| 2004/0100711 | A1 * | 5/2004 | Sato et al. ...................... | 360/48 |

(Continued)

FOREIGN PATENT DOCUMENTS

JP   10-340551   12/1998

(Continued)

*Primary Examiner*—Dismery E Mercedes
(74) *Attorney, Agent, or Firm*—Greer, Burns & Crain, Ltd.

(57) ABSTRACT

A master-disk producing device produces a master disk with master-disk identification information added. A disk producing device produces a first disk with the master-disk identification information added, using the master disk with the master-disk identification information added. A first disk device obtains, after the first disk with the master-disk identification information added is mounted, first correction information from a correction-information storing device based on the master-disk identification information of the first disk.

20 Claims, 19 Drawing Sheets

U.S. PATENT DOCUMENTS

| | | | |
|---|---|---|---|
| 2004/0105184 A1 | 6/2004 | Harada et al. | |
| 2004/0160694 A1* | 8/2004 | Yoshimura | 360/48 |
| 2004/0179285 A1 | 9/2004 | Ogasawara et al. | |
| 2004/0218299 A1* | 11/2004 | Sato et al. | 360/31 |
| 2005/0073762 A1* | 4/2005 | Sato et al. | 360/51 |
| 2006/0007587 A1 | 1/2006 | Oki | |
| 2006/0114599 A1* | 6/2006 | Iwashiro et al. | 360/77.04 |
| 2006/0130316 A1* | 6/2006 | Takase et al. | 29/603.09 |

FOREIGN PATENT DOCUMENTS

| | | |
|---|---|---|
| JP | 11-126444 | 5/1999 |
| JP | 2003-132648 | 5/2003 |
| JP | 2003-346305 | 12/2003 |
| JP | 2004-95023 | 3/2004 |
| JP | 2005-122840 | 5/2005 |
| JP | 2006-155818 | 6/2006 |
| KR | 2001-0113861 | 12/2001 |
| WO | WO 00/58955 | 10/2000 |

* cited by examiner

FIG.4
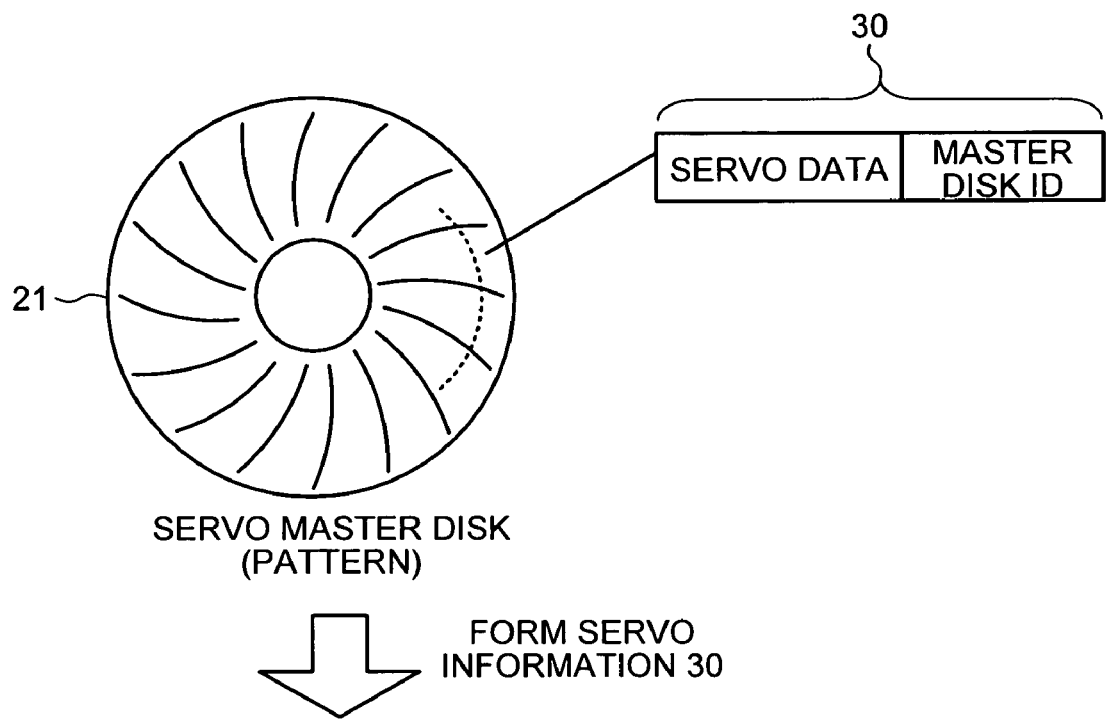
SERVO MASTER DISK
(PATTERN)
⇩ FORM SERVO INFORMATION 30
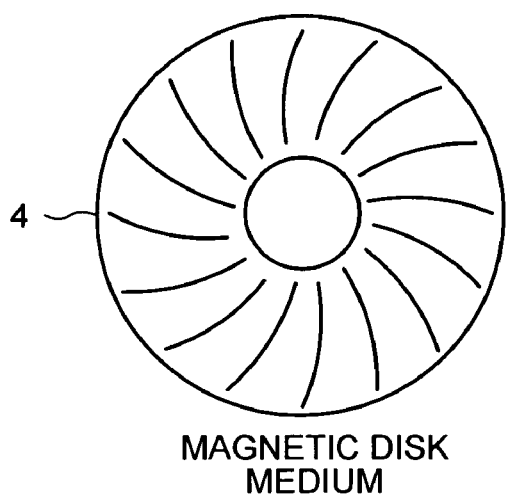
MAGNETIC DISK
MEDIUM

TO SERVO CORRECTION INFORMATION

FIG.12
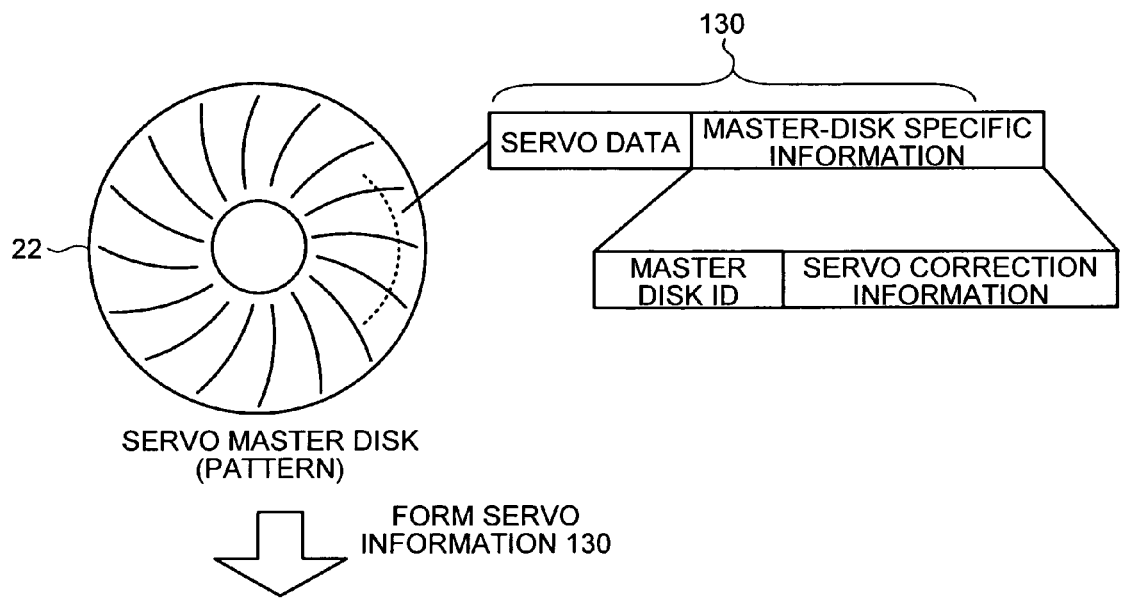
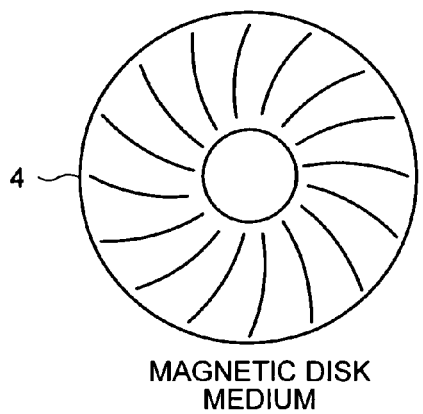
MAGNETIC DISK
MEDIUM

DISK-DEVICE CORRECTING SYSTEM, INFORMATION MANAGING DEVICE, MASTER-DISK PRODUCING DEVICE, AND MASTER-DISK PRODUCING METHOD

BACKGROUND OF THE INVENTION

1. Field of the Invention

The present invention relates to a technology for correcting a servo signal on a servo track generated using a common pattern.

2. Description of the Related Art

Conventionally, an increase of storage capacity of a disk device, such as a magnetic disk device, has been in demand. To increase the storage capacity of the magnetic disk device, it is necessary to reduce the track pitch of the magnetic disk and write a track that includes servo information (servo track) in the right position. One of the methods for writing such a servo track in the right position is a method in which each individual magnetic disk device is provided with a function of writing a servo track in the right position. However, this method increases the price of an individual magnetic disk device.

For this reason, a method in which a servo track is written on a magnetic disk and then the magnetic disk with the servo track written on is mounted on an individual device is being considered. In such a magnetic disk device, it is necessary to perform a positional correction for accurately positioning the head on a target track and a missing portion correction to a missing portion of the servo track. For instance, information for performing control of positioning onto the target track is recorded on the magnetic disk medium and is called a servo signal. A process of recording the servo signal by a magnetic disk device is called a servo track write (STW), and various methods for the STW have been suggested.

Examples of the STW include a method in which a servo signal is generated by using a common pattern (master medium) such as magnetic transferring, a discrete track medium, and a patterned medium (a pattern that serves as a servo master disk) (servo recording system). In these methods, multiple copies of magnetic disks are produced from a common pattern so as to form a servo pattern on each magnetic disk. Thus, the servo pattern can be duplicated at once, and time efficiency in servo recording can be dramatically improved. However, this method has drawbacks, such as a distorted pattern lowering accuracy in positioning onto a target track or causing a missing portion in a servo track. The positioning on the target track therefore must be performed only after making corrections to the track displacement and corrections to the missing portion and the like that are attributed to the distorted pattern and the like.

For instance, a magnetic disk described in Japanese Patent Application Laid-open No. 2004-342316 is configured in such a manner that a control unit that controls the positioning of a magnetic head in accordance with the positional difference based on the servo information performs feed-forward control of the positioning in such a manner as to follow the measured rotational frequency component of the magnetic disk and eliminate higher frequency components than the rotational frequency.

With a method in which a servo pattern is formed using a common pattern, if there is any unfavorable condition such as lowered accuracy or a missing portion in the master disk that serves as the pattern, the servo pattern is completed with all these conditions included in the servo information on the magnetic disk. Thus, it is necessary to make a correction on each individual magnetic disk device to eliminate such unfavorable conditions. In other words, for a magnetic disk device to correct distortion information of a disk (servo signal) attributed to a pattern or the like with the above conventional technology, it is necessary to correct distortion information by measuring the rotational frequency component of the magnetic disk and higher frequency components than the rotational frequency on the magnetic disk device. This causes a problem that it takes a long time to correct the distortion information of a servo pattern on the magnetic disk device, leading to a problem of making the production time of the magnetic disk device longer and lowering the production efficiency. These problems become larger issues as the recording density of a magnetic disk device increases.

SUMMARY OF THE INVENTION

It is an object of the present invention to at least solve the problems in the conventional technology.

A disk-device correcting system according to one aspect of the present invention includes a master-disk producing device that produces a master disk that serves as a pattern when forming a servo signal on a track of a first disk; a disk producing device that produces the first disk on which the servo signal is formed on the track using the master disk; a first disk device that includes the first disk produced by the disk producing device, and reads the servo signal recorded on the track of the first disk while correcting the servo signal; and a correction-information storing device that stores master-disk identification information for identifying the master disk, which is specific information that is specific to the master disk, and first correction information for correcting the servo signal of the first disk produced from the master disk, in a corresponding manner. The master-disk producing device produces the master disk with the master-disk identification information added. The disk producing device produces the first disk with the master-disk identification information added, using the master disk with the master-disk identification information added. The first disk device obtains, after the first disk with the master-disk identification information added is mounted, the first correction information from the correction-information storing device based on the master-disk identification information of the first disk.

An information managing device according to another aspect of the present invention includes a storing unit that stores master-disk identification information for identifying a master disk that serves as a pattern when forming a servo signal on a track of a disk and correction information for correcting the servo signal of the disk, in a corresponding manner; an extracting unit that extracts, based on the master-disk identification information transmitted from a disk device that includes the disk, the correction information corresponding to the master-disk identification information from the storing unit; and an information providing unit that provides the correction information extracted by the extracting unit to the disk device.

A master-disk producing device according to still another aspect of the present invention produces a master disk that serves as a pattern when forming a servo signal on a track of a disk. The master-disk producing device includes a signal forming unit that forms the servo signal on the master disk; and an identification-information adding unit that adds, to the master disk, master-disk identification information for identifying the master disk. The master-disk identification information corresponds to correction information for correcting a servo signal of a first disk produced from the master disk. The correction information is stored in an external storing unit.

A master-disk producing device according to still another aspect of the present invention produces a master disk that serves as a pattern when forming a servo signal on a track of a disk. The master-disk producing device includes a signal forming unit that forms the servo signal on the master disk; and a correction-information adding unit that adds correction information for correcting the servo signal of the disk to the master disk.

A master-disk producing method according to still another aspect of the present invention is for producing a master disk that serves as a pattern when forming a servo signal on a track of a disk. The master-disk producing method includes adding, to the master disk, master-disk identification information for identifying the master disk. The master-disk identification information corresponds to correction information for correcting a servo signal of a first disk produced from the master disk. The correction information is stored in an external storing unit.

A master-disk producing method according to still another aspect of the present invention is for producing a master disk that serves as a pattern when forming a servo signal on a track of a disk. The master-disk producing method includes adding correction information for correcting the servo signal of the disk to the master disk.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic for illustrating a configuration of a servo master disk and a magnetic disk medium according to the first embodiment;

FIG. 12 is a schematic for illustrating a configuration of a servo master disk and a magnetic disk medium according to the second embodiment;

DETAILED DESCRIPTION OF THE PREFERRED EMBODIMENTS

Exemplary embodiments of the present invention will be explained in detail below with reference to the accompanying drawings.

Figure 1:
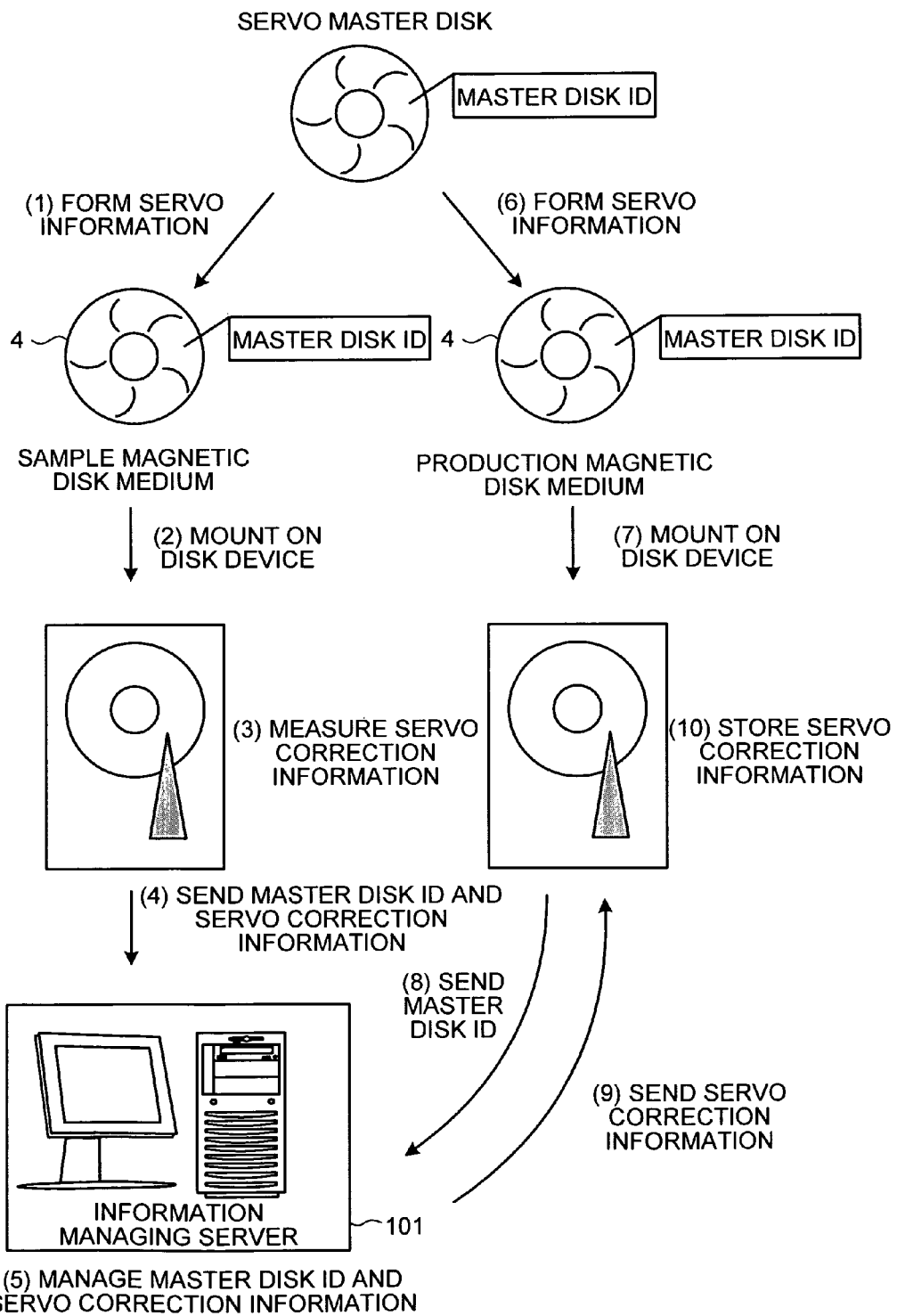
FIG. 1 is a schematic for illustrating a concept of a disk-device correcting system according to a first embodiment of the present invention.

FIG. 1 is a schematic for illustrating a concept of a disk-device correcting system 50 according to a first embodiment of the present invention. According to the first embodiment, a magnetic disk medium 4 is prepared by adding information for identifying the servo master disk (master disk ID) onto a servo master disk.

In other words, a servo-master-disk drawing device first forms a servo master disk that includes a master disk ID (a servo master disk on which servo information is formed), and then prepares a sample magnetic disk medium 4 using this servo master disk (1). The sample magnetic disk medium 4 is mounted on a magnetic disk device (2) to determine the servo condition (servo correction information) (3). The servo correction information determined by the magnetic disk device is sent to an information managing server 101, along with the master disk ID (4). An information managing server 101 manages (stores) the master disk ID and the servo correction information in correspondence with each other (5).

The servo-master-disk drawing device produces a production magnetic disk medium 4 by using the servo master disk from which the sample magnetic disk medium has been produced (6). The production magnetic disk medium 4 is mounted on the magnetic disk device (7), and the magnetic disk device sends the master disk ID stored on the magnetic disk medium 4 to the information managing server 101 (8).

The information managing server 101 extracts servo correction information that corresponds to the master disk ID, based on the master disk ID sent from the magnetic disk device, and then sends it to the magnetic disk device on which the production magnetic disk medium is mounted (9). The magnetic disk device on which the production magnetic disk medium is mounted stores the servo correction information inside the magnetic disk device (10), and uses it as correction information when reading servo information.

Figure 2:
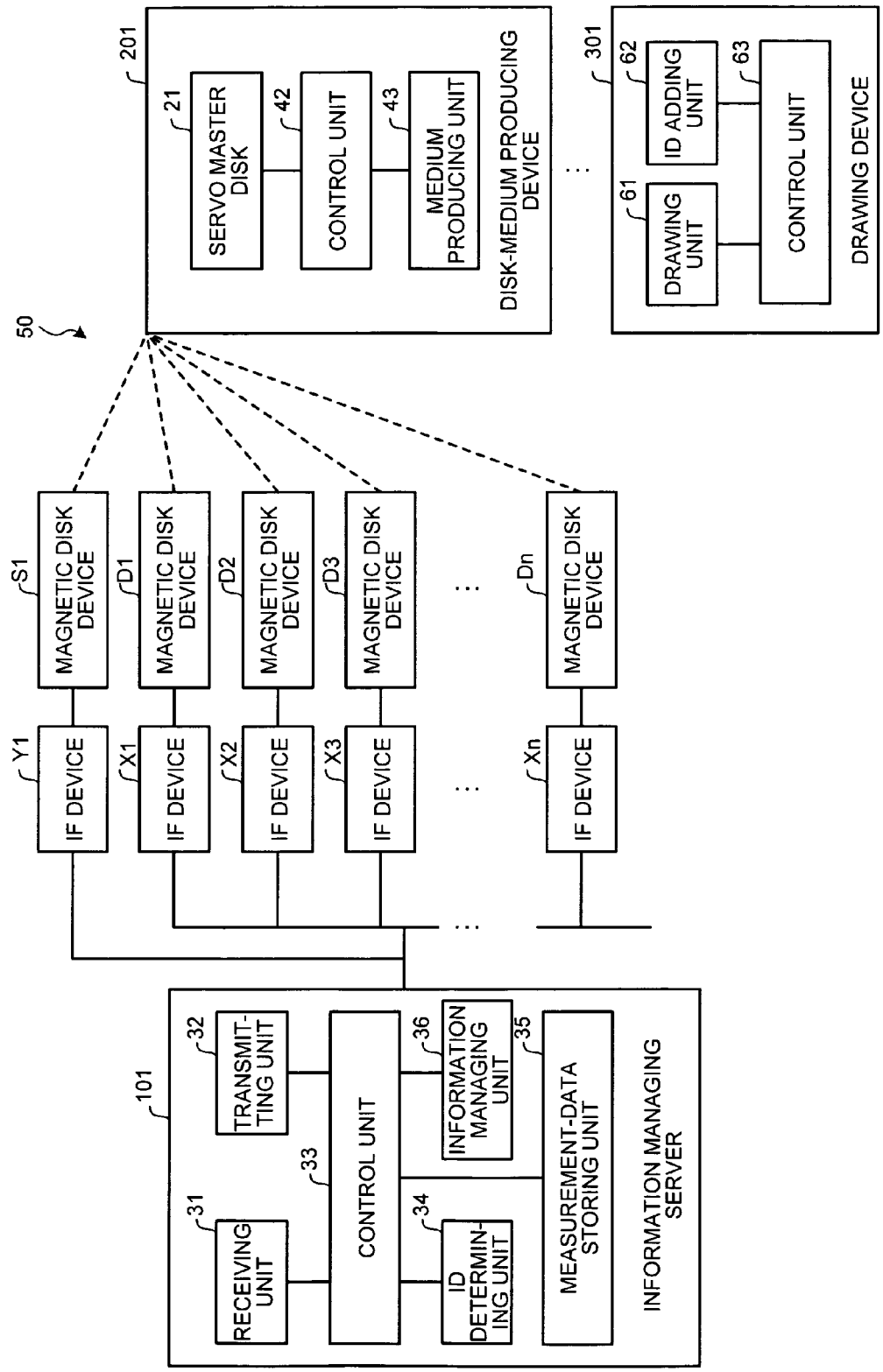
FIG. 2 is a functional block diagram of the disk-device correcting system according to the first embodiment.

FIG. 2 is a functional block diagram of the disk-device correcting system 50 according to the first embodiment. The disk-device correcting system 50 includes the information managing server (information managing device) 101, which is a computer device on a host side (upstream side), magnetic disk devices D1 to Dn (n is a positive integer), a magnetic disk device S1, IF devices X1 to Xn that connect the magnetic disk devices D1 to Dn and the information managing server 101, an IF device Y1 that connects the magnetic disk device S1 and the information managing server 101, a disk-medium producing device (disk producing device) 201, and a drawing device (master-disk producing device) 301.

The disk-medium producing device 201 produces magnetic disk media which are mounted on the magnetic disk devices D1 to Dn and S1, using a master disk (master medium) of a pattern common to the magnetic disk devices D1 to Dn and S1. In the following description, a master disk that is used to record servo information common to the magnetic disk media mounted on the magnetic disk devices D1 to Dn and S1 is referred to as a servo master disk.

The disk-medium producing device 201 includes a servo master disk 21, a control unit 42, and a medium producing unit 43. The medium producing unit 43 uses the servo master disk 21 to form servo information and the like (to produce a magnetic disk medium) on the magnetic disk media mounted on the magnetic disk devices D1 to Dn and S1. The control unit 42 controls the medium producing unit 43.

The drawing device 301 includes a drawing unit (signal forming unit) 61, an ID adding unit (identification-information adding unit) 62, and a control unit 63. The drawing unit 61 writes servo information on a servo master disk to produce a servo master disk. The ID adding unit 62 adds information (such as a master disk ID) that uniquely identifies the servo master disk to the servo information formed by the drawing unit 61. Because the common servo master disk is used for the magnetic disk media mounted on the magnetic disk devices D1 to Dn and S1, the same master disk ID is added to the servo information of all the magnetic disk media. The control unit 63 controls the drawing unit 61 and the ID adding unit 62. Although a master disk ID may be added onto a position other than the servo information, the master disk ID being added to the servo information of the servo master disk will be explained here.

The magnetic disk device S1 is provided with a function of determining information such as a correction value (hereinafter, "servo correction information") with respect to the servo information of the magnetic disk medium, and a function of bringing the determined servo correction information into correspondence with a master disk ID and sending it to the information managing server 101. The servo correction information mentioned here includes positioning correction information for accurately positioning the head onto a target track, missing portion correction information for a missing portion of a servo track, and repeatable position error (RPE) correction information (rotation synchronization components of a head position difference).

The magnetic disk devices D1 to Dn are provided with a function of receiving and storing servo correction information from the information managing server 101. The magnetic disk devices D1 to Dn and S1 each include a magnetic disk medium on which a servo signal is stored using the same servo master disk. For this reason, when the determination of the servo correction information is performed at the magnetic disk devices D1 to Dn and S1, substantially the same servo correction information is determined. According to the first embodiment, the magnetic disk devices D1 to Dn read data from, and write data onto, the magnetic disk medium, using the servo correction information determined by the magnetic disk device S1.

Each of the magnetic disk media on the magnetic disk devices D1 to Dn and S1 stores information (servo signal) that is used for control of positioning on a target track by way of the servo track write. According to the first embodiment, the magnetic disks incorporated in the magnetic disk devices D1 to Dn and S1 store a master disk ID that identifies a servo master disk, along with the servo signal. The servo signal is stored on each of the magnetic disks on the magnetic disk devices D1 to Dn and S1, using a common pattern such as magnetic transferring, a discrete track medium and a patterned medium. In other words, in this method, a pattern for a servo master disk is prepared, and servo information (such as area servo and phase servo) is formed on the magnetic disk, based on this pattern. According to the first embodiment, a master disk ID is added to the pattern as information specific to the master disk. Because of the fact that the servo information for which the same servo master disk is used always has the same properties, the servo information correction is simplified, and the determination time is shortened.

The area servo is a system that uses the signal pattern in the radial direction of a magnetic disk to demodulate the position based on the integral of the signal output. The phase servo is a system that uses the signal pattern in the oblique direction of the magnetic disk to demodulate the position based on the detected phase of the signal pattern.

The IF devices Y1 and X1 to Xn connect the magnetic disk devices S1 and D1 to Dn to the information managing server 101 by way of hard disk drive (HDD) interfaces such as advanced technology attachment (ATA) adapters and small computer system interface (SCSI) adapters.

The information managing server 101 includes a receiving unit 31, a transmitting unit 32, a control unit 33, an ID determining unit (extracting unit and information supplying unit) 34, a measurement-data storing unit 35, and an information managing unit 36. The receiving unit 31 receives a master disk ID and servo correction information from the magnetic disk device S1, and also receives a master disk ID common to the magnetic disk devices S1 and D1 to Dn, from the magnetic disk devices D1 to Dn.

The information managing unit 36 causes the measurement-data storing unit 35 to store the master disk ID and the servo correction information received from the magnetic disk device S1, as master-disk specific information for every master disk ID. The information managing unit 36 causes the measurement-data storing unit 35 to store the master-disk specific information, for example, by track number (for the number of sectors). The measurement-data storing unit 35 is a storing unit that stores master-disk specific information.

Upon receiving a master disk ID from the magnetic disk devices D1 to Dn, the ID determining unit 34 extracts servo correction information (master-disk specific information) that corresponds to the master disk ID, from the measurement-data storing unit 35. The transmitting unit 32 transmits the servo correction information extracted by the ID determining unit 34 and sends it to the magnetic disk devices D1 to Dn via the IF devices X1 to Xn.

The magnetic disk devices S1 and D1 to Dn have the same structure, and thus the magnetic disk device D1 will be taken as an example for the explanation.

Figure 3:
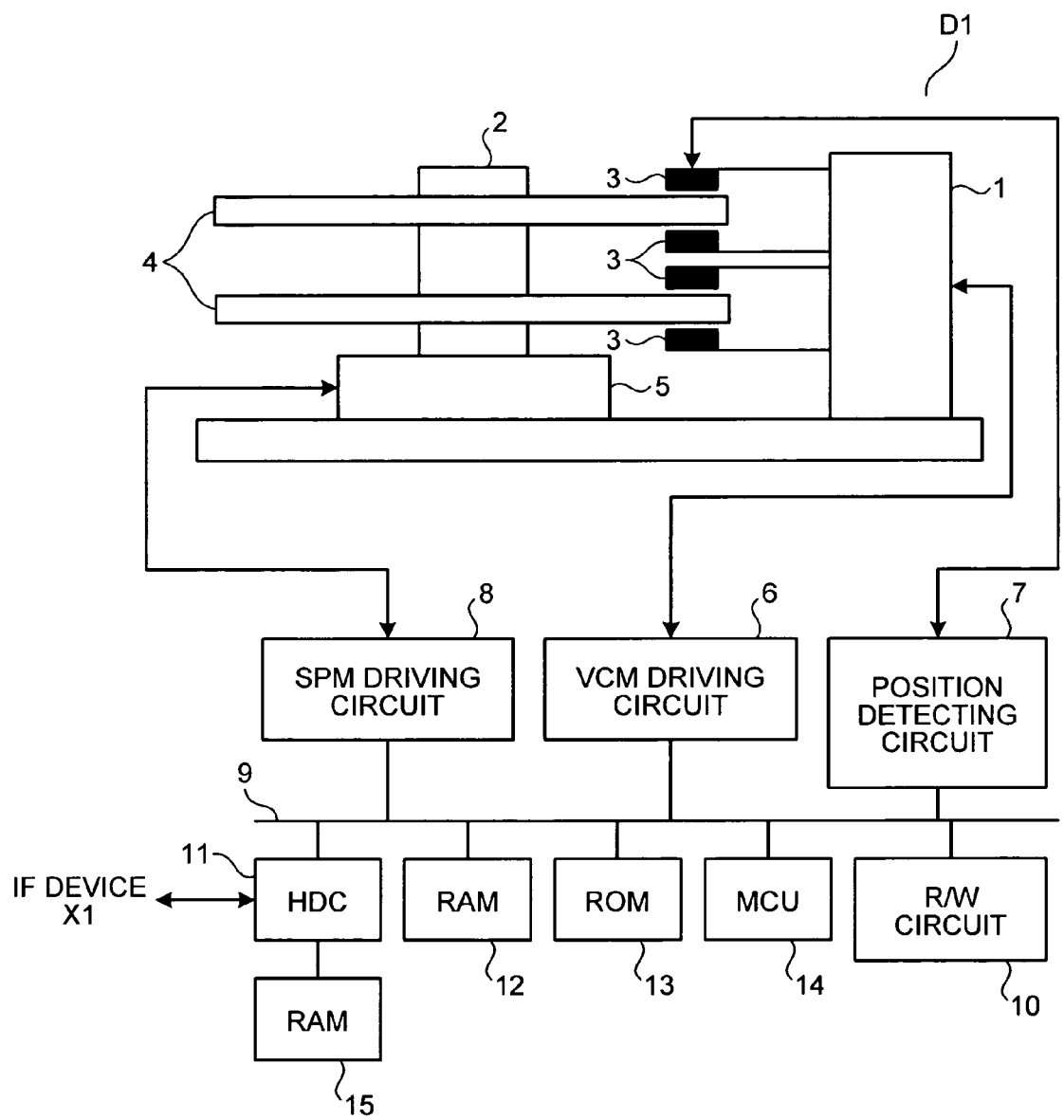
FIG. 3 is a schematic for illustrating a configuration of a magnetic disk device according to the first embodiment.

FIG. 3 is a schematic for illustrating a configuration of the magnetic disk device according to the first embodiment. The magnetic disk device D1 includes magnetic disk media (magnetic storage media) 4 on which servo signals are magnetically stored.

An actuator 1 is configured to include a voice coil motor (VCM) that rotates around a rotation shaft 2. The actuator 1 includes magnetic heads 3 at its distal ends on the side of the magnetic disk media 4, and moves the magnetic heads 3 in the radial direction of the magnetic disk media 4. The actuator 1 drives the magnetic heads 3 and determines the position thereof onto a target track indicated by the servo signal.

The magnetic disk medium 4 is arranged around the rotation shaft of a spindle motor 5. The spindle motor 5 rotates the magnetic disk medium 4 by rotating the rotation shaft 2. The magnetic head 3 includes a read device (read head) that performs reading of data (reads data) from the magnetic disk medium 4 and a write device (write head) that performs writing of data (writes data) onto the magnetic disk medium 4 (not shown).

In this example, two magnetic disk media 4 and four magnetic heads 3 are arranged in the magnetic disk device D1, and the magnetic disk media 4 and the magnetic heads 3 are simultaneously driven by a single actuator 1.

Data is written onto and read from the magnetic disk medium 4 at the timing when the target sector rotates to the position of the magnetic head 3, while the actuator 1 controls and brings the magnetic head 3 to be positioned on the center of the target track.

A position detecting circuit 7 is connected to the magnetic head 3 to convert a position signal (an analog signal) read by the magnetic head 3 from the magnetic medium 4 (positional information of the magnetic head 3 with respect to the magnetic disk medium 4) to a digital signal. The position detecting circuit 7 inputs the digital signal obtained after the conversion, to an MCU 14.

A spindle-motor (SPM) driving circuit 8 is connected to the spindle motor 5 to drive the spindle motor 5. A voice-coil-motor (VCM) driving circuit 6 is connected to the voice coil motor of the actuator 1 to supply a driving current to the voice coil motor and thereby drive the actuator 1. A read/write (R/W) circuit 10 controls the reading and writing operations of the magnetic heads 3.

A microcontroller (MCU) 14 detects the current position of a magnetic head with respect to the magnetic disk medium 4, based on the digital position signal transmitted from the position detecting circuit 7, and calculates a VCM drive command value, based on the difference between the detected current position and the target position. The MCU 14 performs positional recovery and servo control on the magnetic head 3 with respect to the magnetic disk medium 4, based on the VCM drive command value.

A read only memory (ROM) 13 stores control programs that are to be used in the MCU 14 and the like. A random access memory (RAM) 12 temporarily stores read data read from the magnetic disk medium 4 and write data to be written onto the magnetic disk medium 4.

A hard disk controller (HDC) 11 determines the rotational position of the magnetic disk medium 4 (position of the magnetic head 3 with respect to the magnetic disk medium 4), based on the sector number of the servo signal from the magnetic disk medium 4, and records and reproduces the data of the magnetic disk medium 4. The HDC 11 is connected to the IF device X1 by way of an HDD interface such as an ATA adaptor and an SCSI adaptor to communicate with the information managing server 101. A bus 9 connects the position detecting circuit 7, the SPM driving circuit 8, the VCM driving circuit 6, the R/W circuit 10, the MCU 14, the ROM 13, the RAM 12, the HDC 11, and a RAM 15.

According to the first embodiment, the servo correction information (master-disk specific information) obtained from the information managing server 101 is stored in a memory region such as the RAM 12 so that the MCU 14 can use this servo correction information to control different circuits. The magnetic disk device S1 stores the self-measured servo correction information in a memory region such as the RAM 12 so that the MCU 14 can use this servo correction information to control different circuits.

Although the structure of the magnetic disk device D1 that includes two magnetic disk media 4 is taken as an example of the magnetic disk device D1, the magnetic disk device D1 may have a structure that includes a single magnetic disk medium 4, or three magnetic disk media 4 or more.

FIG. 4 is a schematic for illustrating a configuration of the servo master disk and the magnetic disk medium according to the first embodiment. Servo signals (position signals) are stored on a servo master disk (pattern) 21 in an arc shape with respect to the radial direction from the center of rotation. The servo signals here include servo information 30 that is configured to include servo data and a master disk ID.

The magnetic disk medium 4 is prepared by using the servo master disk 21, and the servo information 30 is stored in the magnetic disk medium 4. The actuator 1 intermittently detects the servo signals while rotating the magnetic disk medium 4 at a constant rotation velocity.

Figure 5:
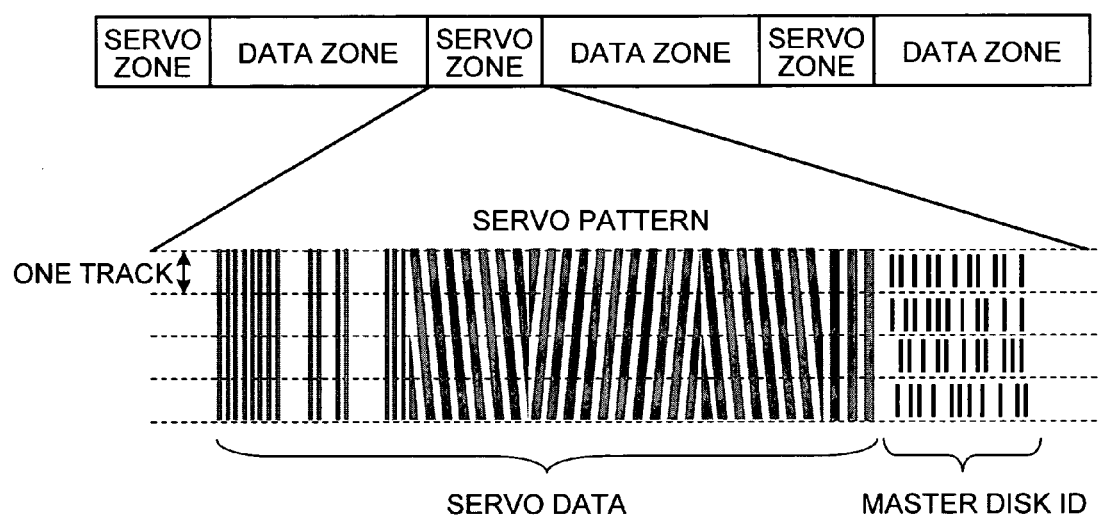
FIG. 5 is a schematic for illustrating an example of structure of an information pattern on the servo master disk shown in FIG. 4.

FIG. 5 is a schematic for illustrating an example of structure of an information pattern on the servo master disk shown in FIG. 4. Servo zones and data zones are alternately arranged in the information pattern of the servo master disk 21.

Servo data that is constituted with a servo pattern and a master disk ID that is the main feature of the first embodiment are stored in the servo zones. The servo data here is configured to include a servo mark that indicates the starting position of a servo signal, a gray code that indicates a track number of tracks arranged concentrically in the radial direction of the magnetic disk medium 4, an index that indicates the rotational position, biphasic servo signals (offset information) that indicate a minute displacement amount in the radial direction (PosA, PosB, PosC, PosD), and the like. The data zone is an area from which data is read and into which data is written by a user.

Figure 6:
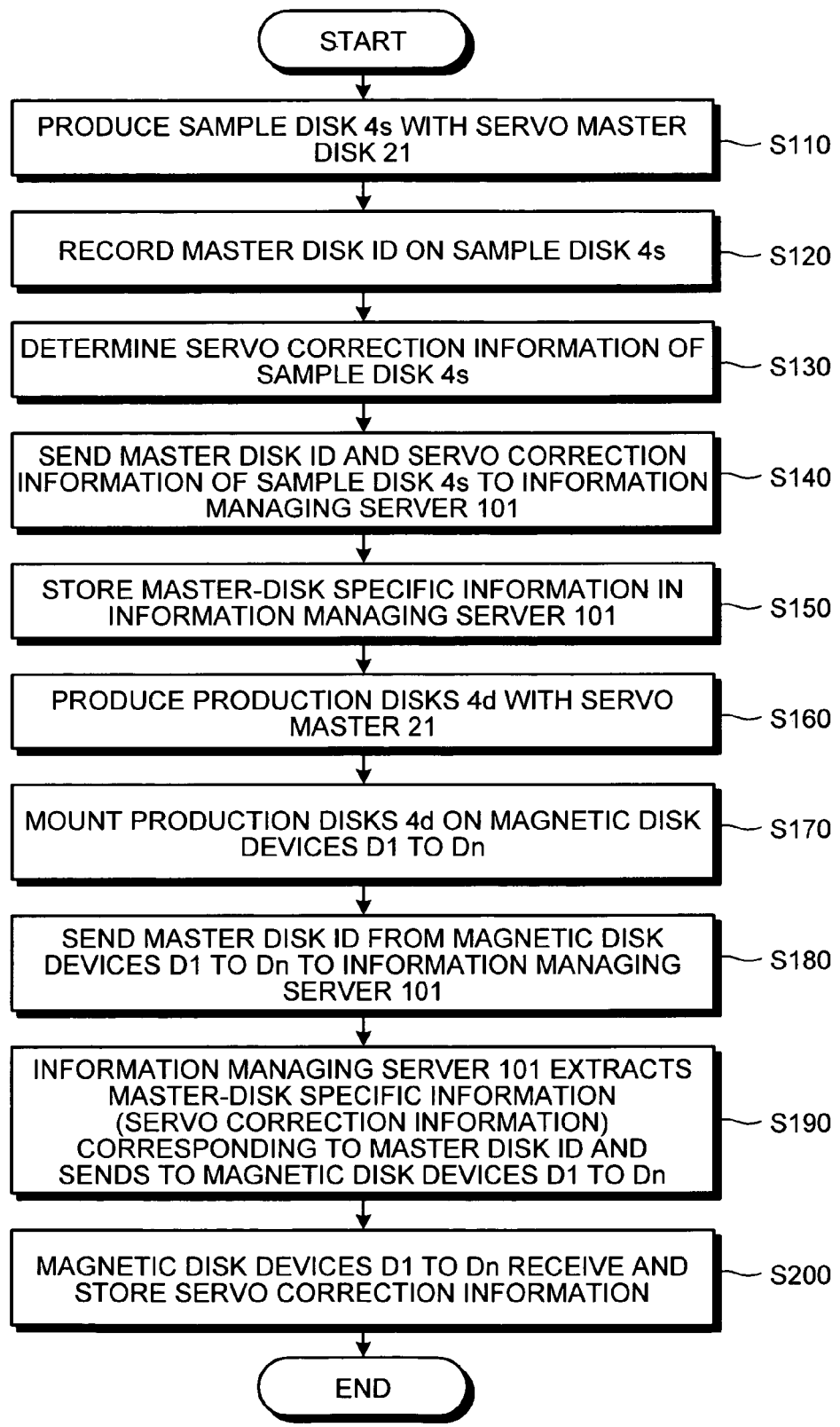
FIG. 6 is a flowchart of a processing procedure for an operating process of the disk-device correcting system according to the first embodiment.
Figure 7:
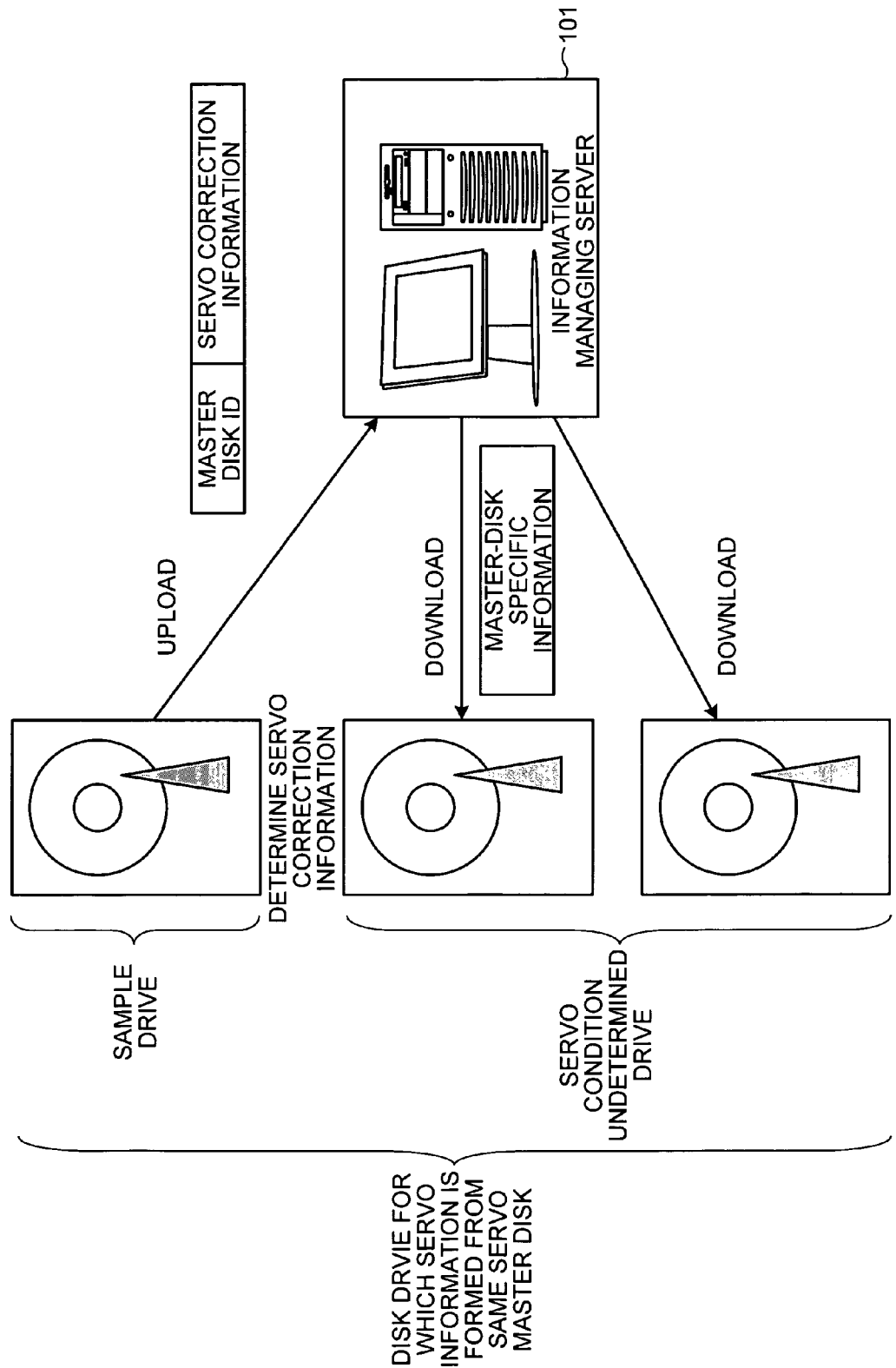
FIG. 7 is a schematic for illustrating the operating process of the disk-device correcting system according to the first embodiment.

FIG. 6 is a flowchart of a processing procedure for an operating process of the disk-device correcting system 50 according to the first embodiment. FIG. 7 is a schematic for illustrating the operating process of the disk-device correcting system 50 according to the first embodiment.

In the following description, the operational procedure of the disk-device correcting system 50 will be explained, for the sake of convenience, by referring to the magnetic disk medium 4 placed on the magnetic disk device S1 as a sample disk 4s and the magnetic disk media 4 placed on the magnetic disk devices D1 to Dn as production disks 4d. The sample disk 4s and the production disks 4d are disks on which servo information is formed from the same servo master disk 21.

The drawing unit 61 of the drawing device 301 prepares the servo master disk 21. At this time, the ID adding unit 62 causes the master disk ID of the servo master disk 21 to be stored in a servo zone of the servo master disk 21 together with the servo data.

The medium producing unit 43 of the disk-medium producing device 201 produces the sample disk 4s by using the servo master disk 21 produced by the drawing device 301 (Step S110). At this time, the servo data stored in the servo zone of the servo master disk 21 and the master disk ID are stored in the sample disk 4s (Step S120).

Figure 8:
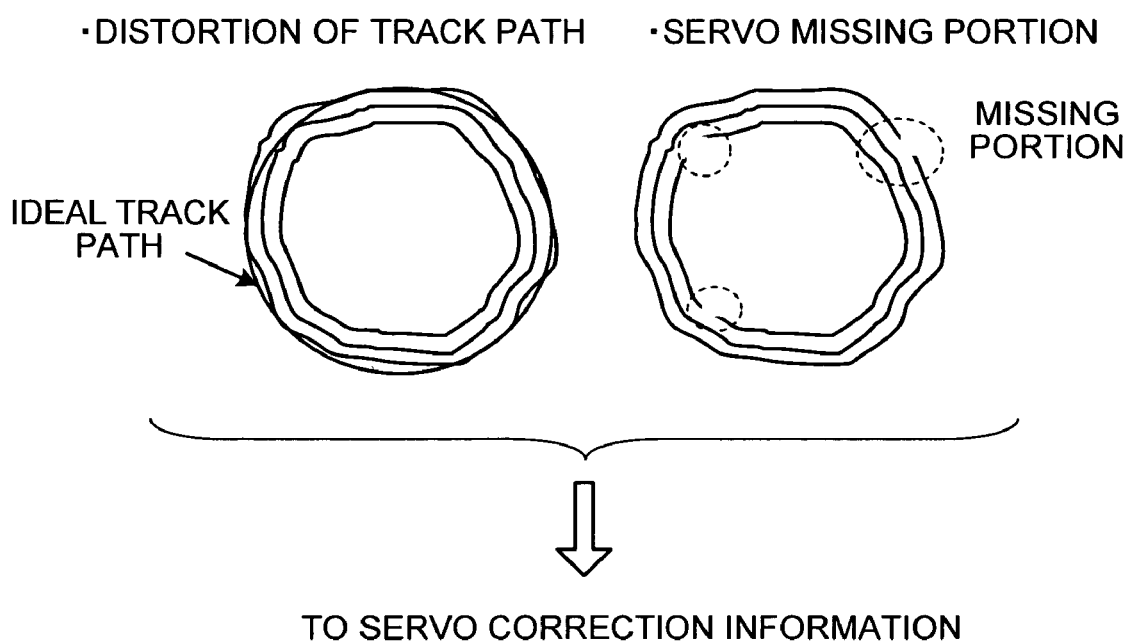
FIG. 8 is a schematic for explaining servo correction information.

The sample disk 4s is placed on the magnetic disk device S1 (sample drive), and the magnetic disk device S1 determines the servo correction information of the sample disk 4s (second correction information) (Step S130). The servo correction information will be explained in detail here. FIG. 8 is a schematic for explaining the servo correction information.

When the drawing device of the servo master disk 21 produces the servo master disk 21, it is preferable that each track be formed in a perfect circle. However, there is a case in which a track (track path) may be distorted owing to a deviation at the stage of the drawing device. Further, there is also a case in which a track may be distorted during the step of bringing the servo master disk 21 into tight contact with the magnetic disk medium 4 (such as the transferring step incorporating nanoimprinting or magnetic transferring).

When the disk-medium producing device 201 forms the servo information on the magnetic disk medium 4 under such a condition, a track that is originally supposed to be a perfect circle is recorded in a distorted form, which increases a positional deviation when the magnetic head 3 performs tracking. The positional deviation caused by the track distortion consists predominantly of rotation synchronization components. If the correction information for correcting the positional deviation is prepared in advance, the positional deviation can be suppressed (corrected). Hence, according to the first embodiment, the fact that the correction information for the positional deviation (servo correction information) has the same properties as far as the same servo master disk 21 is incorporated is used. In other words, the correction information for the rotation synchronization components of the positional deviation is determined as servo correction information, and the correction information for the rotation synchronization components of the positional deviation is included in the servo correction information.

In an ideal case, when the drawing device 301 produces the servo master disk 21, all the servo information should be recorded without any missing portion. However, a missing portion may be formed in a servo pattern, if, for example, dust is contained in the photoresist. In addition, dust contained during a process of bringing the servo master disk 21 to close contact with the magnetic disk medium 4 may also induce a missing portion in the servo pattern. Once dust adheres to the servo master disk 21 (pattern), the missing portion is repeated in all the servo patterns thereafter. Thus, the first embodiment is based on the fact that the magnetic disk media 4 produced by using the same servo master disk 21 have missing portions in the same positions of the servo patterns. In other words, the missing portion information of the servo pattern and the correction information for correcting the mission portions are determined as servo correction information, and the missing portion information of the servo pattern and the correction information for correcting the mission portions are included into the servo correction information.

When the magnetic disk device S1 determines the servo correction information of the sample disk 4s, the magnetic disk device S1 is connected to the information managing server 101 so that a request command for the servo correction information is sent from the information managing server 101 (control unit 33) to the magnetic disk device S1. The magnetic disk device S1 transmits (uploads) the determined servo correction information and the master disk ID of the servo master disk 21 to the information managing server 101 (Step S140). The servo correction information and the master disk ID of the servo master disk 21 are received by the receiving unit 31 of the information managing server 101. The information managing unit 36 of the information managing server 101 brings the servo correction information and the master disk ID received from the magnetic disk device S1 into correspondence with each other, and causes the measurement-data storing unit 35 to store it as master disk specific information. (Step S150).

Thereafter, the medium producing unit 43 of the disk-medium producing device 201 produces the production disk 4d by using the servo master disk 21 (Step S160). Here, the servo data and the master disk ID recorded in the servo zone of the servo master disk 21 are recorded on the production disk 4d.

The production disks 4d are mounted on the corresponding magnetic disk devices D1 to Dn (drives whose servo conditions have not been determined) (Step S170), and the magnetic disk devices D1 to Dn are connected to the information managing server 101. The information managing server 101 (control unit 33) transmits a command for requesting a master disk ID to the magnetic disk devices D1 to Dn. Upon this, the magnetic disk devices D1 to Dn transmit the master disk ID of the production disks 4d (master disk ID of the servo master disk 21) to the information managing server 101 (Step S180).

The receiving unit 31 of the information managing server 101 receives the master disk ID and inputs it to the ID determining unit 34. The ID determining unit 34 extracts, from the measurement-data storing unit 35, the servo correction information (master-disk specific information) corresponding to the master disk ID received from the magnetic disk devices D1 to Dn. In other words, the information managing server 101 here defines, by obtaining the master disk ID, from which servo master disk the servo information on the production disks 4d has been recorded. The transmitting unit 32 of the information managing server 101 transmits the servo correction information extracted by the ID determining unit 34 to the magnetic disk devices D1 to Dn (Step S190).

The magnetic disk devices D1 to Dn receive (download) the servo correction information (first correction information) from the information managing server 101 to store in a predetermined storing unit (Step S200). The magnetic disk devices D1 to Dn may store the servo correction information in the production disks 4d by way of the magnetic head 3, or store the servo correction information in the RAM 12 and the like.

Thereafter, the magnetic disk devices D1 to Dn perform a data read/write processing from and onto the magnetic disk media 4 (production disks 4d) by using the stored servo correction information. Because the servo correction information of the magnetic disk media 4 prepared using the same servo master disk 21 exhibits substantially the same properties, the magnetic disk devices D1 to Dn are allowed to omit the determination (calculation) of the servo correction information.

The magnetic disk devices D1 to Dn may newly perform a processing of determining the servo correction information by using the servo correction information received from the information managing server 101 as a default. In such a case, because the magnetic disk devices D1 to Dn are provided with the default of the servo correction information, the servo correction information can be re-calculated in a short time.

According to the first embodiment, the information managing server 101 stores the master-disk specific information (defects in the servo conditions and correction information) obtained from a single sample disk 4s. However, the structure may be such that the master-disk specific information is obtained from a plurality of sample disks 4s and stored in the information managing server 101. In such a case, when receiving the master disk IDs and the servo correction information from magnetic disk devices which use servo master disks different from each other, the information managing unit 36 of the information managing server 101 brings each master disk ID into correspondence with the servo correction information and organizes it as a database. The information managing unit 36 here may perform calculation processing such as averaging on the servo correction information corresponding to the same master disk ID, processing that improves the reliability of the servo correction information, processing that removes abnormal data, and the like.

According to the first embodiment, after the information managing server 101 causes the measurement-data storing unit 35 to store the master-disk specific information received from the magnetic disk device S1, the production disk 4d is produced by using the servo master disk 21. The timing of producing the production disk 4d is not limited to this, however. In other words, the production disk 4d may be produced by using the servo master disk 21 before the information managing server 101 causes the measurement-data storing unit 35 to store the master-disk specific information received from the magnetic disk device S1. For instance, the production disk 4d may be produced by using the servo master disk 21 when the sample disk 4s is produced by using the servo master disk 21.

In addition, although the first embodiment has a structure in which the servo correction information request command is transmitted from the information managing server 101 to the magnetic disk device S1, the structure may be such that the magnetic disk device S1 voluntarily transmits the servo correction information to the information managing server 101 without receiving the request command from the information managing server 101.

Furthermore, although the first embodiment has a structure in which the master disk ID request command is transmitted from the information managing server 101 to the magnetic disk devices D1 to Dn, the structure may be such that the magnetic disk devices D1 to Dn voluntarily transmit the master disk ID to the information managing server 101 without receiving the request command from the information managing server 101, and make a request for sending the servo correction information from the information managing server 101.

According to the first embodiment, the magnetic disk media 4 of the magnetic disk devices D1 to Dn and S1 are produced by using the same servo master disk 21, and the information managing server 101 stores the servo correction information of the magnetic disk medium 4 obtained from the magnetic disk device S1 (sample disk 4s) in correspondence with the master disk ID. Thus, it is possible for the magnetic disk devices D1 to Dn to obtain the servo correction information of the magnetic disk media 4 (production disks 4d) from the information managing server 101 based on the master disk ID. As a result, the magnetic disk devices D1 to Dn can efficiently obtain the servo correction information that corresponds to the servo master disk 21 with a simple structure, and readily correct the servo signal of the magnetic disk medium 4 mounted on each device.

Figure 9:
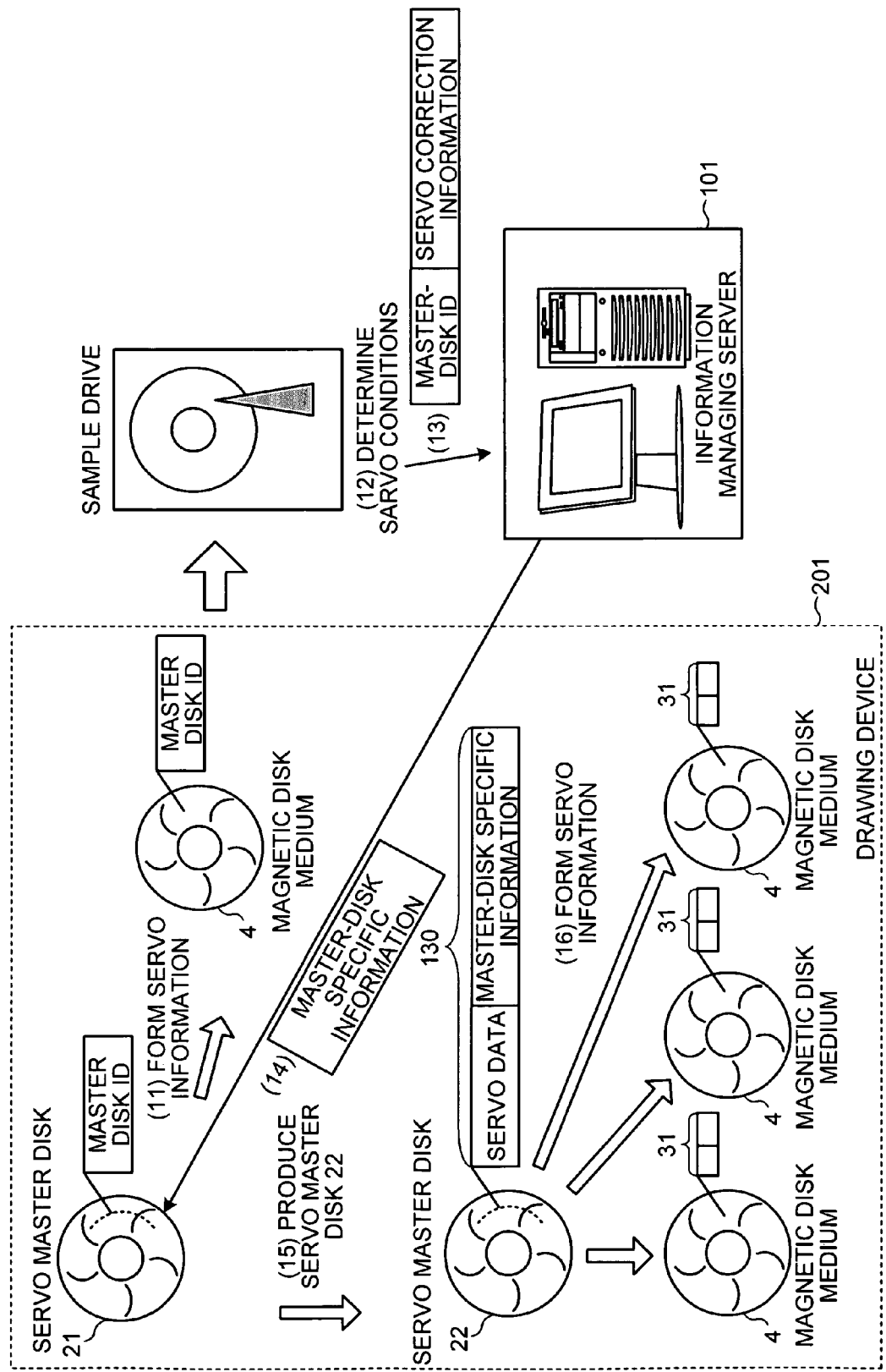
FIG. 9 is a schematic for illustrating a concept of a disk-device correcting system according to a second embodiment of the present invention.

FIG. 9 is a schematic for illustrating a concept of a disk-device correcting system 51 according to a second embodiment of the present invention. According to the second embodiment, the magnetic disk media 4 for the magnetic disk devices D1 to Dn are produced by adding servo correction information to a servo master disk produced by the drawing device 301.

The drawing device 301 prepares servo information including a master disk ID on the servo master disk 21 and uses the servo master disk 21 to produce the magnetic disk medium 4 (11). The magnetic disk medium 4 is mounted on a sample drive (magnetic disk device S1), where the servo condition (servo correction information) is determined (12). The servo correction information determined by the sample drive is sent to the information managing server 101 along with the master disk ID (13), and the information managing server 101 organizes (stores) it.

The servo correction information stored by the information managing server 101 is sent to the drawing device 301 (14). The drawing device 301 adds servo information including this servo correction information to the servo master disk 21 to form a servo master disk 22 (15). Further, the drawing device 301 produces the magnetic disk media 4 to be mounted on the magnetic disk devices D1 to Dn, by using the servo master disk 22 (16). As a result, the magnetic disk media 4 to which servo correction information is added can be attained.

Figure 10:
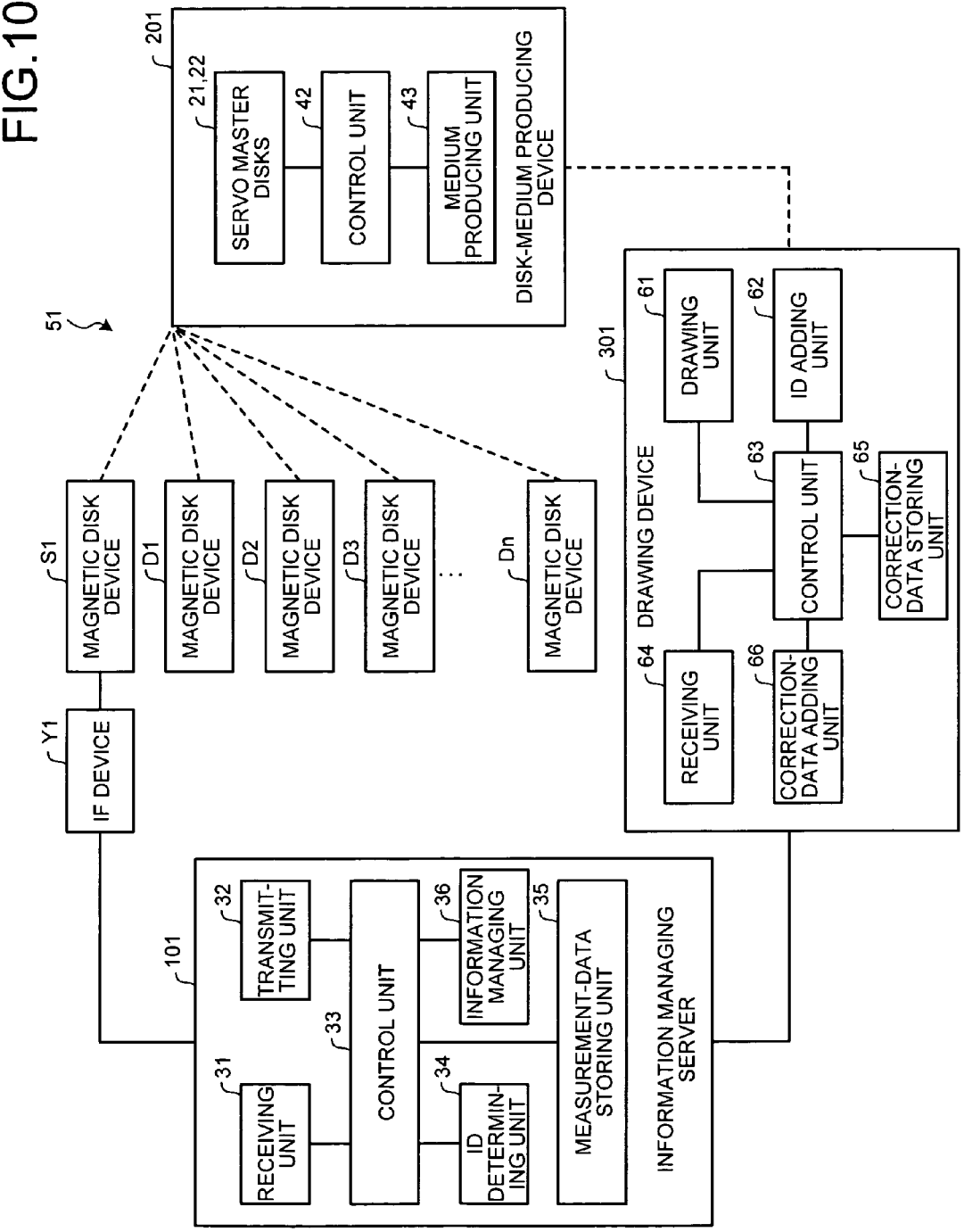
FIG. 10 is a functional block diagram of the disk-device correcting system according to the second embodiment.

FIG. 10 is a functional block diagram of the disk-device correcting system 51 according to the second embodiment. Among the structural elements in FIG. 10, the same numerals are added to the structural elements that serve the same functions as in the disk-device correcting system 50 according to the first embodiment as shown in FIG. 2, and the overlapping explanation is omitted.

The disk-device correcting system 51 includes the information managing server 101, the magnetic disk devices D1 to Dn, the magnetic disk device S1, an IF device Y1, the disk-medium producing device 201, and the drawing device 301.

The disk-medium producing device 201 here includes the servo master disk 22, which will be explained below, in addition to the serve master disk 21. The medium producing unit 43 produces a magnetic disk medium that is to be supplied to the magnetic disk device S1 by using the servo master disk 21, and also produces magnetic disk media that are to be supplied to the magnetic disk devices D1 to Dn by using the servo master disk 22 that is prepared by adding the servo correction information to the servo master disk 21. The information managing server 101 here does not include the ID determining unit 34, unlike the information managing serve 101 according to the first embodiment.

The drawing device 301 includes a receiving unit 64, a correction-data storing unit 65, and a correction-data adding unit 66, in addition to the drawing unit 61, the ID adding unit 62, and the control unit 63. The receiving unit 64 receives the servo correction information (master-disk specific information) from the information managing server 101. The correction-data storing unit 65 stores the servo correction information received by the receiving unit 64. The correction-data adding unit 66 adds the servo correction information stored in the correction-data storing unit 65 to the servo information of a magnetic disk medium formed by the drawing unit 61.

The drawing unit 61 produces the servo master disk 21 for producing the magnetic disk medium 4 that is to be supplied to the magnetic disk device S1 and the servo master disk 22 for producing the magnetic disk media 4 that are to be supplied to the magnetic disk devices D1 to Dn. The servo master disk 22 is a disk prepared by adding the servo correction information stored in the correction-data storing unit 65 to the servo master disk 21.

Figure 11:
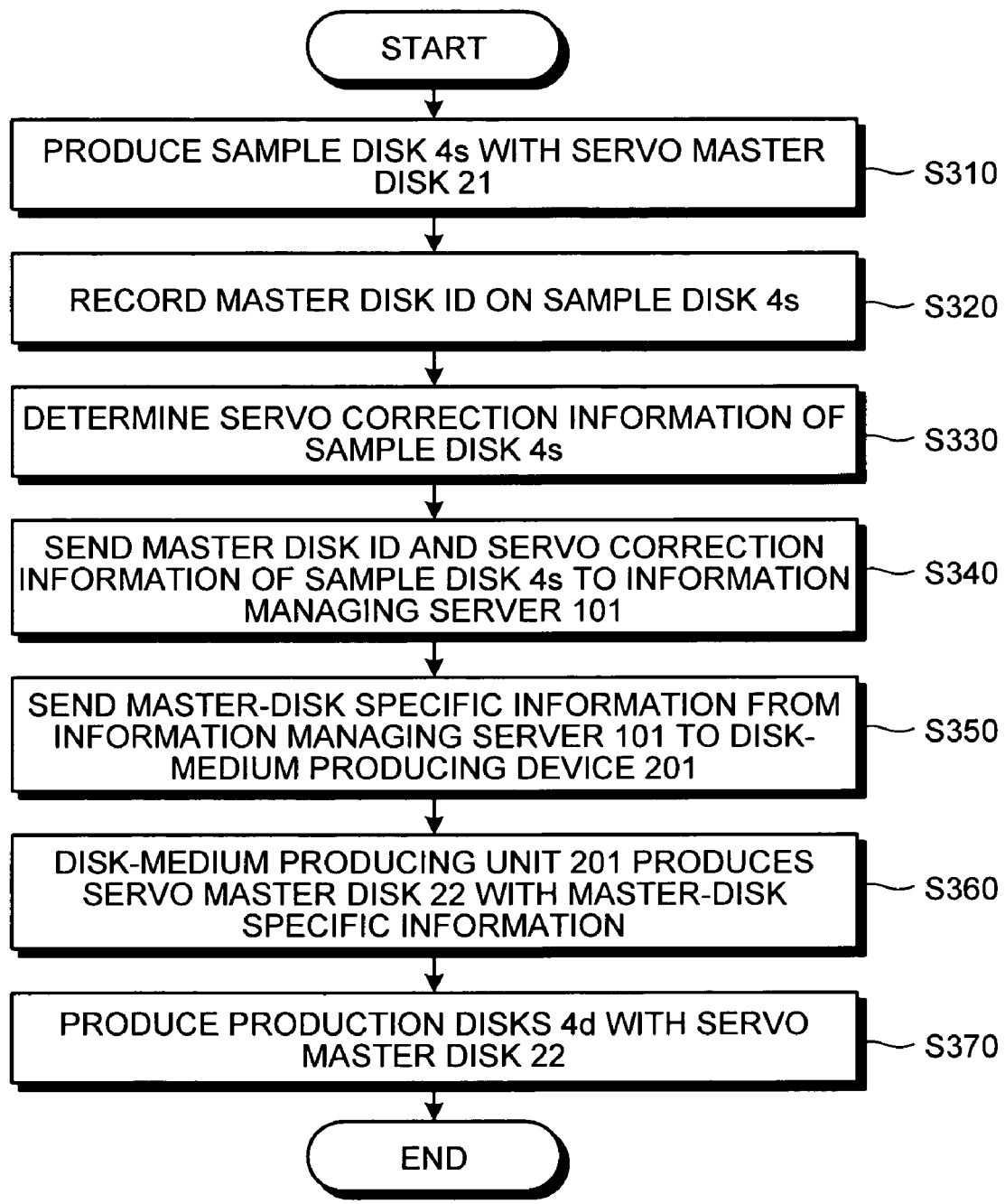
FIG. 11 is a flowchart of a processing procedure for an operating process of the disk-device correcting system according to the second embodiment.

FIG. 11 is a flowchart of a processing procedure for an operating process of the disk-device correcting system 51 according to the second embodiment. The explanation of the procedure of the same processes as in the disk-device correcting system 50 according to the first embodiment explained with reference to FIG. 6 will be omitted.

The drawing unit 61 of the drawing device 301 produces the servo master disk 21. Here, the ID adding unit 62 stores the master disk ID of the servo master disk 21 in the servo zone of the servo master disk 21, along with the servo data.

The medium producing unit 43 of the disk-medium producing device 201 produces the sample disk 4s by using the servo master disk 21 produced by the drawing device 301 (Step S310). Here, the servo data and the master disk ID stored in the servo zone of the servo master disk 21 are recorded on the sample disk 4s (Step S320). Next, the sample disk 4s is mounted on the magnetic disk device S1 so that the magnetic disk device S1 determines the servo correction information of the sample disk 4s (Step S330).

The magnetic disk device S1 is connected to the information managing server 101 to send a servo correction information request command from the information managing server 101 (control unit 33) to the magnetic disk device S1. The magnetic disk device S1 sends the determined servo correction information and the master disk ID of the servo master disk 21 to the information managing server 101 (Step S340).

The information managing unit 36 of the information managing server 101 brings the servo correction information received from the magnetic disk device S1 into correspondence with the master disk ID, and stores it as the master-disk specific information in the measurement-data storing unit 35.

Thereafter, the master-disk specific information stored in the measurement-data storing unit 35 of the information managing server 101 is sent from the transmitting unit 32 to the drawing device 301 (Step S350). The receiving unit 64 of the drawing device 301 receives this master-disk specific information from the information managing server 101 and stores it in the correction-data storing unit 65. The drawing unit 61 produces the servo master disk 22 for forming production disks 4d that are to be mounted the magnetic disk devices D1 to Dn. The correction-data adding unit 66 adds the servo correction information stored in the correction-data storing unit 65 to the servo information of the servo master disk 21 prepared by the drawing unit 61 to cause the drawing unit 61 to produce the servo master disk 22 (Step S360).

The medium producing unit 43 of the disk-medium producing device 201 produces production disks 4d by using the servo master disk 22 (Step S370). Here, the servo data and the servo correction information stored in the servo zone of the servo master disk 22 are recorded on the production disks 4d.

FIG. 12 is a schematic for illustrating a configuration of the servo master disk 22 and the magnetic disk medium 4 according to the second embodiment. Servo information 130 of the servo master disk (pattern) 22 includes the master-disk specific information configured to include the master disk ID and the servo correction information, along with the servo data. The magnetic disk medium 4 here is produced by using the servo master disk 22, and the servo information 130 is recorded onto the magnetic disk medium 4.

Figure 13:
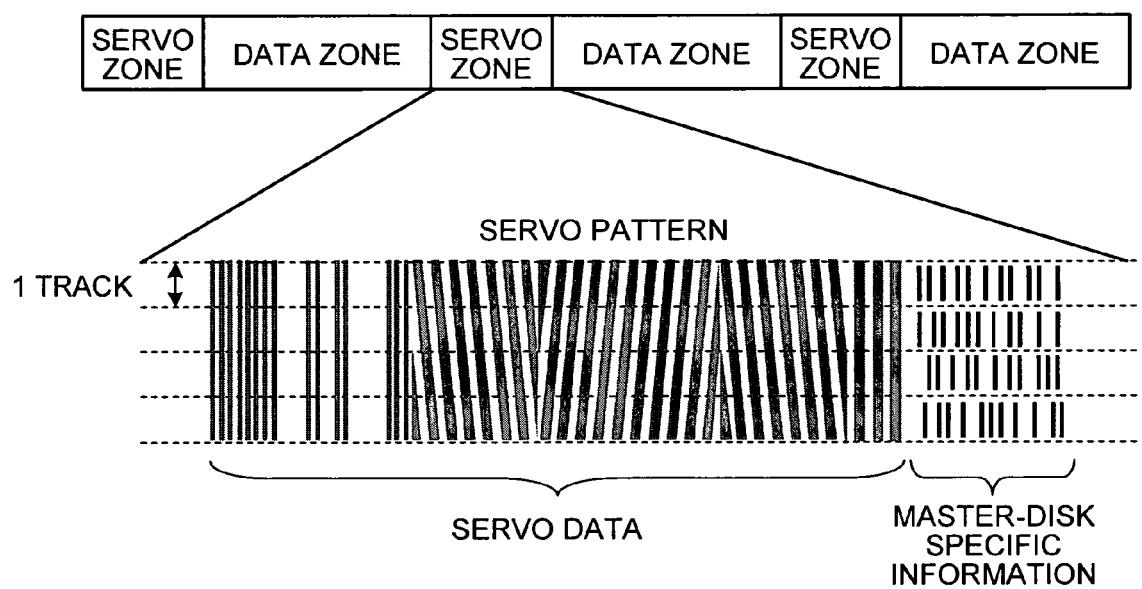
FIG. 13 is a schematic for illustrating an example of structure of an information pattern on the servo master disk shown in FIG. 12.

FIG. 13 is a schematic for illustrating an example of structure of an information pattern on the servo master disk 22 shown in FIG. 12. In the information pattern of the servo master disk 22, servo zones and data zones are alternately arranged. The master-disk specific information (master disk ID and servo correction information), which is the main feature of the second embodiment, and the servo data configured with the servo pattern are stored in the servo zones.

Thereafter, the production disks 4d are mounted on the magnetic disk devices D1 to Dn so that the magnetic disk devices D1 to Dn perform data write/read processing onto the magnetic disk media 4 (production disks 4d) by using the stored servo correction information. Because the servo correction information of the magnetic disk media 4 that are produced by using the same servo master disk 21 exhibits substantially the same properties, the magnetic disk devices D1 to Dn are allowed to omit the determination of the servo correction information.

The magnetic disk devices D1 to Dn may newly perform the process of determining the servo correction information by using the servo correction information of the magnetic disk media 4 as a default. Moreover, the structure may be such that the servo correction information obtained through this process is sent to the information managing server 101 so that the information managing server 101 (information managing unit 36) performs management on the servo correction information received from the magnetic disk devices D1 to Dn, together with the servo correction information received from the magnetic disk device S1.

According to the second embodiment, the magnetic disk media 4 of the magnetic disk devices D1 to Dn and S1 are produced by using the same servo master disk 21, and the information managing server 101 stores the servo correction information of the magnetic disk medium 4 obtained from the magnetic disk device S1 in correspondence with the master disk ID. Hence, the drawing device 301 can obtain the servo correction information of the magnetic disk medium 4 from the information managing server 101.

As a result, the drawing device 301 can produce the servo master disk 22 for producing the production disks 4d that are to be mounted on the magnetic disk devices D1 to Dn, by adding the servo correction information to the servo information of the servo master disk 21. Thus, the magnetic disk devices D1 to Dn can efficiently obtain the servo correction information that corresponds to the servo master disk 22 with a simple structure, which facilitates the correction of the servo signal on the magnetic disk medium 4 mounted on each device.

In the method of preparing a pattern that serves as the servo master disks 21 and 22 and then forming the servo information on the magnetic disk media 4 by using this pattern, the center of the servo tracks of the magnetic disk media 4 does not coincide with the rotational center of the magnetic disk devices D1 to Dn and S1, causing eccentricity. There are two causes of this; one is the eccentricity caused when duplicating the pattern or forming a servo pattern based on the pattern, and the other is the eccentricity caused when incorporating the magnetic disk media 4 on which the servo pattern is formed into the magnetic disk devices D1 to Dn and S1. For this reason, the information specific to the servo master disk such as the master disk ID and the servo correction information recorded on the pattern sometimes may fail to be accurately read out in the magnetic disk devices D1 to Dn and S1.

Figure 14:
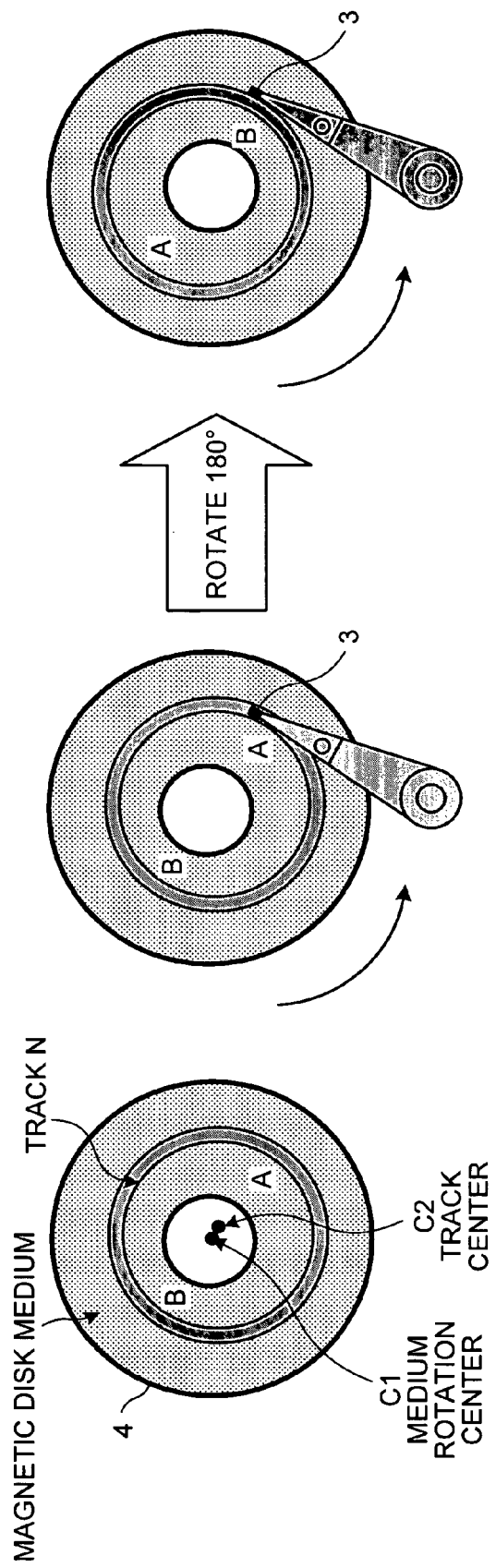
FIG. 14 is a schematic for illustrating an eccentricity caused by a center of a servo track and a medium rotation center.

FIG. 14 is a schematic for illustrating the eccentricity caused by the center of the servo track and the medium rotation center. As shown in this drawing, when the magnetic head 3 is positioned on the track N on the magnetic disk medium 4 where the rotational center C1 of the medium does not coincide with the track center C2 that is the center of the servo track, the magnetic head 3 may not fall onto the track N. In other words, when the magnetic head 3 measures the magnetic disk medium 4 (track N) on the side of the position A, the magnetic head 3 is positioned on the track N (can read the information from the track N). When the magnetic disk medium 4 rotates 180 degrees (when measuring on the side of the position B), however, the magnetic head 3 may not be positioned on the track N (may be unable to read the information from the track N).

Figure 15:
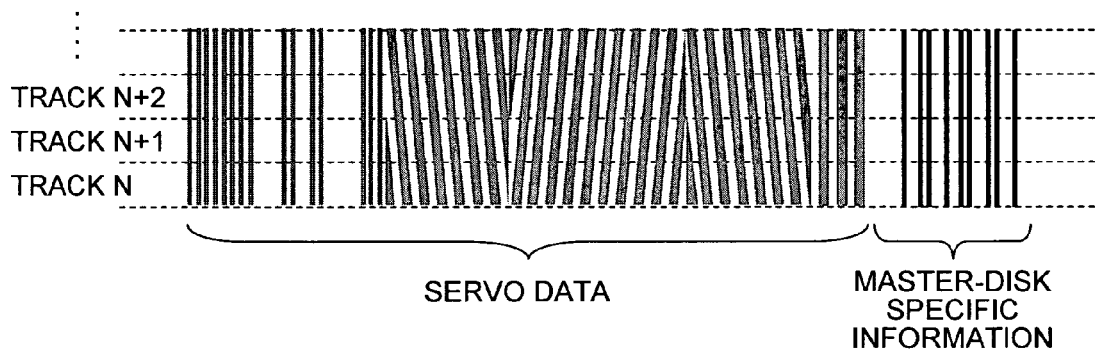
FIG. 15 is a schematic for illustrating an example of structure of master-disk specific information in identical linear patterns over a plurality of tracks.

Thus, according to a third embodiment of the present invention, the information specific to the servo master disk (master-disk specific information, for example) may be recorded on the servo master disks 21 and 22 as identical linear patterns over several tracks in the radial direction of the magnetic disk medium 4. FIG. 15 is a schematic for illustrating an example of structure of the master-disk specific information in identical linear patterns over a plurality of tracks on the servo master disk.

The master-disk specific information (codes) is recorded redundantly in an area larger than the amount of eccentricity (on the identical linear patterns over several tracks) in the radial direction. For this reason, even if eccentricity appears, the magnetic head 3 passes the region in which the master-disk specific information is recorded, preventing the magnetic head 3 from failing to read the servo information.

Furthermore, in the method where patterns for the servo master disks 21 and 22 are prepared and servo information is formed on the magnetic disks based on these patterns, the magnetic head 3 may fail to read the information specific to the servo master disks (master-disk specific information) such as the master disk ID and servo correction information (missing bits) when the bit length is small. In magnetic transferring, for instance, a smaller pattern lowers the magnetizing capability more, and pattern formation may be degraded in nanoimprinting.

Figure 16:
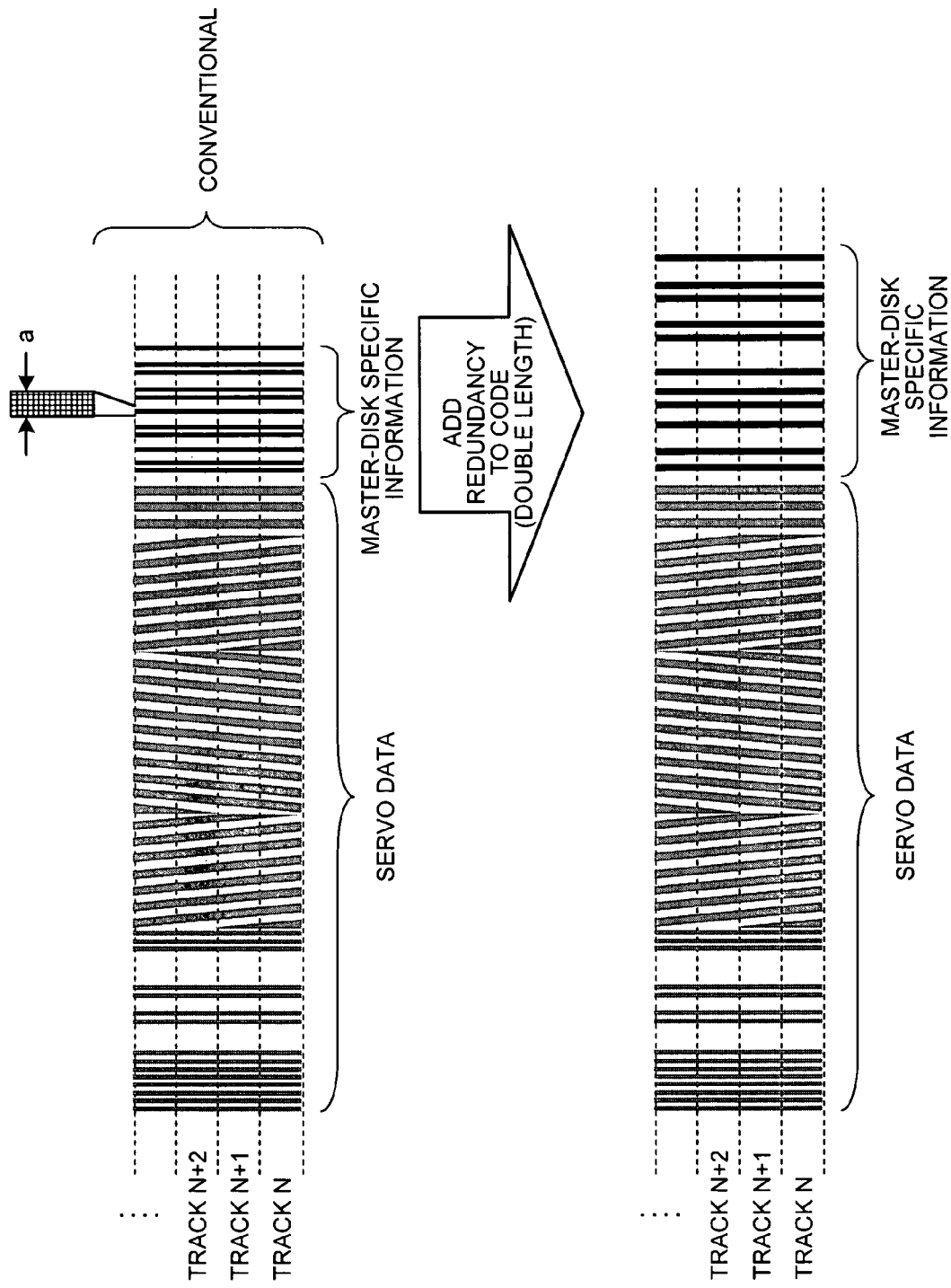
FIG. 16 is a schematic for illustrating an example of structure of the master-disk specific information when a bit length of the master-disk specific information is extended.

For this reason, according to the third embodiment, a code modulation is performed in such a manner that the bit length of the servo master-disk specific information is greater than the servo signal and that demodulation is performed by the magnetic disk devices D1 to Dn and S1 to correspond to the extended bits. FIG. 16 is a schematic for illustrating an example of structure of the master-disk specific information when a bit length of the master-disk specific information is extended.

The master-disk specific information of the servo master disks 21 and 22 is formed to have the bit length of the master-disk specific information that is double the bit length described in the First and second embodiments (bit length of the conventional servo data). The master-disk specific information of the magnetic disk medium 4 can thereby be readily read out.

Moreover, it is essential for the information pattern specific to the servo included in the servo master disk (such as master-disk specific information) to be accurately reproduced in the magnetic disk devices D1 to Dn and S1. In the method in which servo information is recorded by using a servo master disk that servers as a pattern, there is a case of causing defects or missing portions in the servo information. The information pattern specific to the servo therefore may be redundantly recorded (recorded several times) so that it can be read several times.

Figure 17:
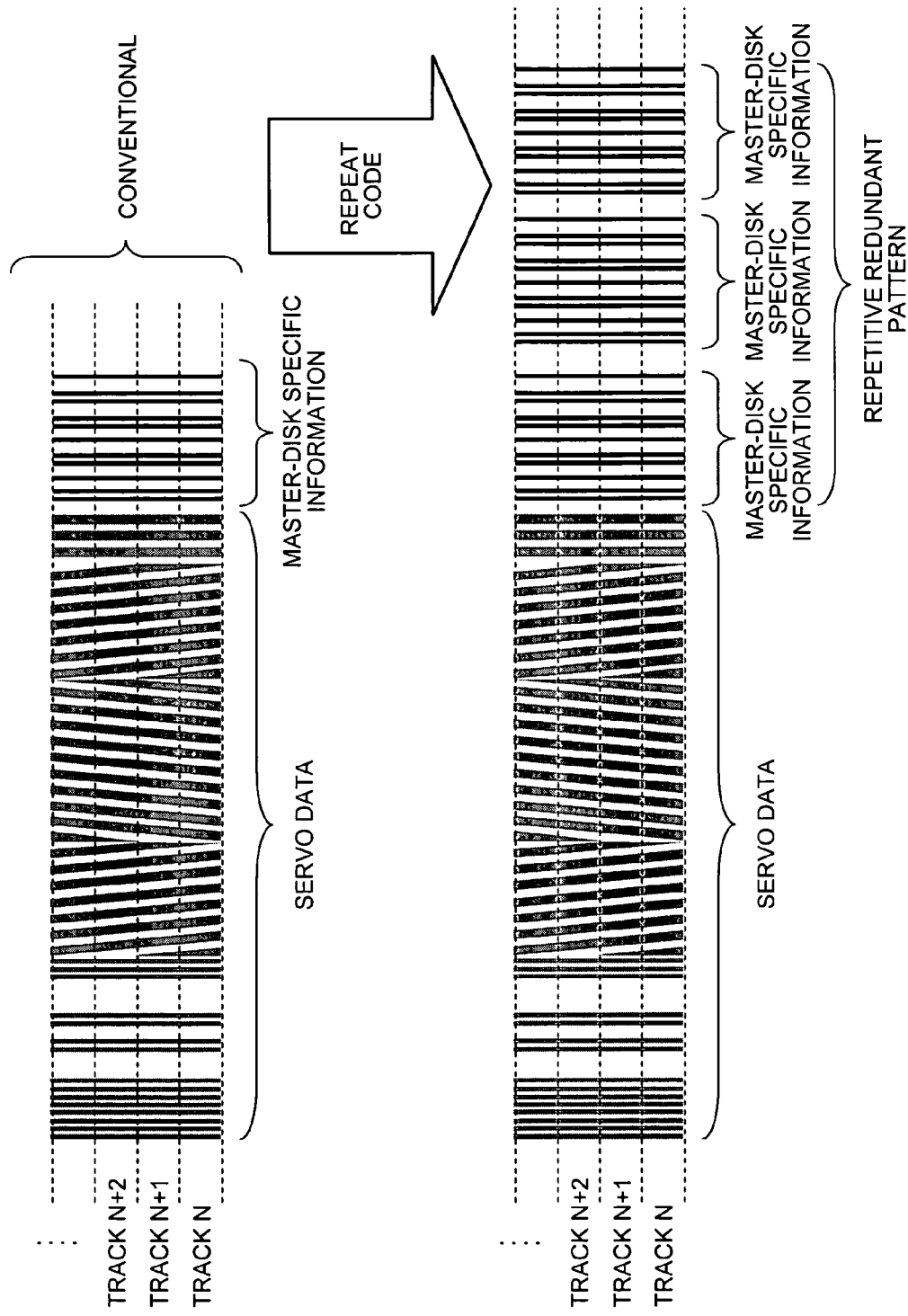
FIG. 17 is a schematic for illustrating an example of structure of the master-disk specific information where the same pattern is recorded a plurality of times.

FIG. 17 is a schematic for illustrating an example of structure of the master-disk specific information where the same pattern is recorded a plurality of times. The same master-disk specific information is recorded a plurality of times on the servo master disk, and the master-disk specific information of the servo master disks 21 and 22 is formed as a repetitive redundant pattern. A failure of reading the master-disk specific information and the like can be avoided in the magnetic disk devices D1 to Dn and S1.

Figure 18:
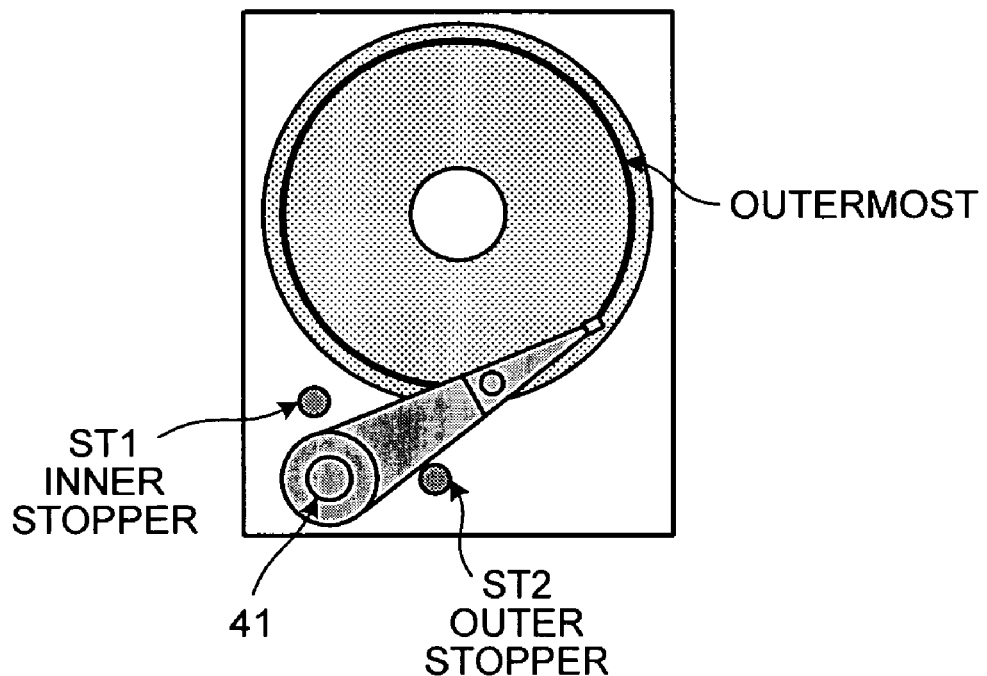
FIG. 18 is a schematic for illustrating a reproduction of the master-disk specific information recorded in an outermost track.
Figure 19:
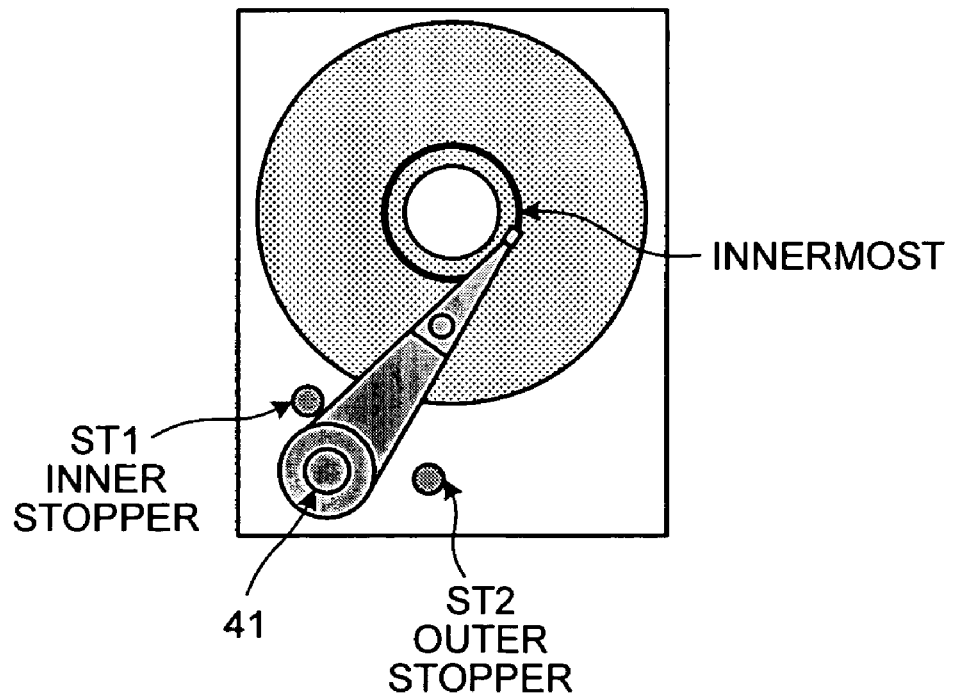
FIG. 19 is a schematic for illustrating a reproduction of the master-disk specific information recorded in an innermost track.

A pattern such as the master-disk specific information may be recorded in an outermost or an innermost track (movable limit positions of the magnetic head with respect to the tracks). FIG. 18 is a schematic for illustrating a reproduction of the master-disk specific information recorded in the outermost track. FIG. 19 is a schematic for illustrating a reproduction of the master-disk specific information recorded in the innermost track.

The master-disk specific information and the like is reproduced in the magnetic disk devices D1 to Dn and S1 by applying a constant current to the driving device (actuator 1) of the magnetic head 3 to press the arm of the magnetic head 3 against the stopper, without performing tracking with the magnetic head 3.

As shown in FIG. 18, when the pattern such as the master-disk specific information is recorded in the outermost track, the master-disk specific information and the like can be reproduced by pressing the arm of the magnetic head 3 against the outer stopper ST2.

On the other hand, as shown in FIG. 19, when the pattern such as the master-disk specific information is recorded in the innermost track, the master-disk specific information and the like can be reproduced by pressing the arm of the magnetic head 3 against the inner stopper ST1.

This eliminates the need of tracking, and thus the master-disk specific information can be reproduced regardless of the condition of the servo formed on the magnetic disk medium 4. Furthermore, because the position at which the master-disk specific information and the like is recorded is the easiest position to locate, the recording position of the master-disk specific information and the like can be readily located by MFM observation, reproduction waveform observation, or the like.

Generally, the pattern length of the servo zone is greater than the pattern of the data zone. Thus, by incorporating the master-disk specific information and the like into the servo pattern in the servo zone, the same result can be achieved as when extending the bit length of the master-disk specific information.

Furthermore, by incorporating the master-disk specific information into the servo pattern in the servo zone (preparing it to have the same pattern length as the servo pattern), the master-disk specific information can be gathered within the time spent for positioning in the magnetic disk devices D1 to Dn and S1. This improves the efficiency in reading and writing user data from and into the data zone. Here, among multiple sectors included in a single lap of a track, the master-disk specific information may be recorded in all the sectors, or the master-disk specific information may be recorded in the limited sectors such as index sectors.

Figure 20:
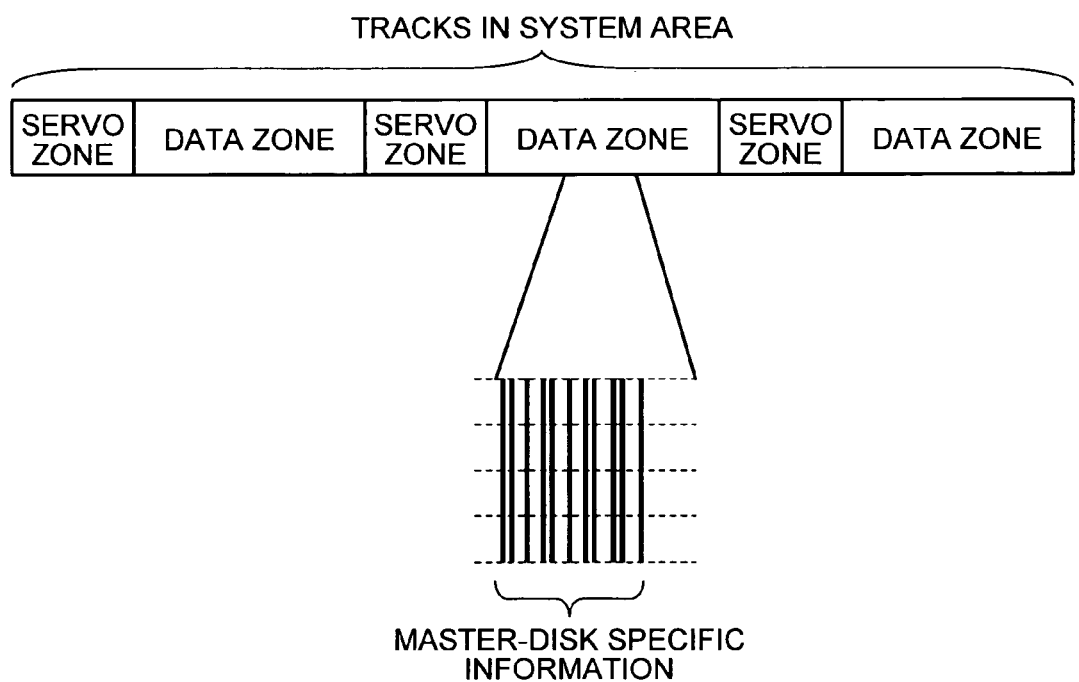
FIG. 20 is a schematic for illustrating an example of structure of the master-disk specific information recorded in an area corresponding to a system area on the servo master disk.

The servo correction information calculated by the magnetic disk device S1 is recorded in the system area in which the information for controlling the magnetic disk device is stored (data region in a predetermined cylinder area). Thus, the master-disk specific information and the like may be recorded in a region that corresponds to a track of the system area on the servo master disks 21 and 22. FIG. 20 is a schematic for illustrating an example of structure of the master-disk specific information recorded in an area corresponding to a system area on the servo master disk. By recording the master-disk specific information and the like in the region that corresponds to the track of the system area on the servo master disks 21 and 22, the area in which the user data is written is separated from the area in which the master-disk specific information is recorded, which improves the maintainability and security of the data. The servo correction information and the master disk ID described in the First through third embodiments correspond to the specific information described in the claims.

According to an embodiment of the invention, the first disk device has a first disk mounted thereon to which master-disk identification information for identifying a master disk is added, and obtains and stores the first correction information for correcting the servo signal of the first disk from an information storing device based on the master-disk identification information. Hence, there is an advantage that the first disk device can efficiently correct the servo signal on the first disk with a simple structure.

Furthermore, according to an embodiment of the present invention, the first correction information is the second correction information for correcting a servo signal of the second disk measured by the second disk device having the second disk produced with the same master disk as that of the first disk. Thus, there is an advantage that the first disk device can obtain the first correction information that is highly reliable.

Moreover, according to an embodiment of the present invention, the first correction information includes information for correcting a rotation synchronization component of a positional difference generated on a track when reading the servo signal. Thus, there is an advantage that a positional difference attributed to track distortion can be effectively corrected.

Furthermore, according to an embodiment of the present invention, because the first correction information includes information for correcting a missing portion of the servo signal on the track, there is an advantage that the missing portion of the servo signal can be effectively corrected even when the missing portion of the servo signal is passed on from the master disk to the first disk.

Moreover, according to an embodiment of the present invention, the correction information for the servo signal of the disk that corresponds to the master-disk identification information is extracted, based on the master-disk identification information sent from the disk device having a disk, and is transmitted to the disk device. Thus, there is an advantage that the disk device can efficiently correct the servo signal on the first disk with a simple structure.

Furthermore, according to an embodiment of the present invention, a master disk is produced by adding master-disk identification information for identifying this master disk. Thus, there are advantages that the disk device having a disk produced from the master disk can obtain correction information from an external storing device, based on the master-disk identification information, and that the disk device can efficiently correct the servo signal on the first disk with a simple structure.

Moreover, according to an embodiment of the present invention, the master disk is produced by adding to the master disk the correction information for correcting the servo signal of a disk. Thus, there are advantages that the disk device on which the disk produced from the master disk is mounted can obtain the correction information from an external storing device based on the master-disk identification information, and that the disk device can efficiently correct the servo signal on the first disk with a simple structure.

Furthermore, according to an embodiment of the present invention, a master disk is produced by adding master-disk identification information for identifying this master disk. Thus, there are advantages that the disk device on which the disk produced from the master disk is mounted can obtain the correction information from an external storing device based on the master-disk identification information, and that the disk device can efficiently correct the servo signal on the first disk with a simple structure.

Moreover, according to an embodiment of the present invention, the master disk is produced by adding to the master disk the correction information for correcting the servo signal of a disk. Thus, there are advantages that the disk device on which the disk produced from the master disk is mounted can obtain the correction information from an external storing device based on the master-disk identification information, and that the disk device can efficiently correct the servo signal on the first disk with a simple structure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk-device correcting system comprising:
    a master-disk producing device that produces a master disk that serves as a pattern when forming a servo signal on a track of a first disk, the master disk including one of a medium for magnetic transfer, a discrete track medium, and a patterned medium;
    a disk producing device that produces the first disk on which the servo signal is formed on the track using the master disk:
    a first disk device that includes the first disk produced by the disk producing device, and reads the servo signal recorded on the track of the first disk while correcting the servo signal; and
    a correction-information storing device that stores master-disk identification information for identifying the master disk, which is specific information that is specific to the master disk, and first correction-information for correcting the servo signal of the first disk produced from the master disk, in a corresponding manner,
    wherein:
        the master-disk producing device produces the master disk with the master-disk identification information added,
        the disk producing device produces the first disk with the master-disk identification information added, using the master disk with the master-disk identification information added,
        the first disk device obtains, after the first disk with the master-disk identification information added is mounted, the first correction information from the correction-information storing device based on the master-disk identification information of the first disk, and
        the first correction information includes information for correcting a missing portion of the servo signal on the track.

2. The disk-device correcting system according to claim 1, further comprising:
    a second disk device that includes a second disk produced from a master disk that is common to the first disk,
    wherein the first correction information is second correction information for correcting a servo signal of the second disk measured by the second disk device.

3. The disk-device correcting system according to claim 1, wherein the first correction information includes information for correcting a rotation synchronization component of a positional difference on the track when reading out the servo signal.

4. The disk-device correcting system according to claim 1, wherein the specific information is recorded on a same line across a plurality of tracks on the first disk in a radial direction of the first disk.

5. The disk-device correcting system according to claim 1, wherein the specific information is recorded with a bit length longer than the servo signal on the track on the first disk.

6. The disk-device correcting system according to claim 1, wherein the specific information is recorded repeatedly a plurality of times in a direction of the track on the first disk.

7. The disk-device correcting system according to claim 1, wherein the specific information is recorded by being included in the servo signal on the first disk.

8. A disk-device correcting system comprising:
    a master-disk producing device that produces a master disk that serves as a pattern when forming a servo signal on a track of a first disk, the master disk including one of a medium for magnetic transfer, a discrete track medium, and a patterned medium;

a disk producing device that produces the first disk on which the servo signal is formed on the track using the master disk:

a first disk device that includes the first disk produced by the disk producing device, and reads the servo signal recorded on the track of the first disk while correcting the servo signal; and a correction-information storing device that stores master-disk identification information for identifying the master disk, which is specific information that is specific to the master disk, and first correction-information for correcting the servo signal of the first disk produced from the master disk, in a corresponding manner, wherein:
the master-disk producing device produces the master disk with the master-disk identification information added, the disk producing device produces the first disk with the master-disk identification information added, using the master disk with the master-disk identification information added, the first disk device obtains, after the first disk with the master-disk identification information added is mounted, the first correction information from the correction-information storing device based on the master-disk identification information of the first disk, and the specific information is recorded on either one or an innermost track position and an outermost track position corresponding to a movable limit position of a head that reads the servo signal with respect to the track on the first disk.

9. The disk-device correcting system according to claim 8, further comprising:

a second disk device that includes a second disk produced from a master disk that is common to the first disk, wherein the first correction information is second correction information for correcting a servo signal of the second disk measured by the second disk device.

10. The disk-device correcting system according to claim 8, wherein the first correction information includes information for correcting a rotation synchronization component of a positional difference on the track when reading out the servo signal.

11. The disk-device correcting system according to claim 8, wherein the specific information is recorded on a same line across a plurality of tracks on the first disk in a radial direction of the first disk.

12. The disk-device correcting system according to claim 8, wherein the specific information is recorded with a bit length longer than the servo signal on the track on the first disk.

13. The disk-device correcting system according to claim 8, wherein the specific information is recorded repeatedly a plurality of times in a direction of the track on the first disk.

14. The disk-device correcting system according to claim 8, wherein the specific information is recorded by being included in the servo signal on the first track.

15. A disk-device correcting system comprising:

a master-disk producing device that produces a master disk that serves as a pattern when forming a servo signal on a track of a first disk, the master disk including one of a medium for magnetic transfer, a discrete track medium, and a patterned medium;

a disk producing device that produces the first disk on which the servo signal is formed on the track using the master disk:

a first disk device that includes the first disk produced by the disk producing device, and reads the servo signal recorded on the track of the first disk while correcting the servo signal; and a correction-information storing device that stores master-disk identification information for identifying the master disk, which is specific information that is specific to the master disk, and first correction-information for correcting the servo signal of the first disk produced from the master disk, in a corresponding manner, wherein:
the master-disk producing device produces the master disk with the master-disk identification information added, the disk producing device produces the first disk with the master-disk identification information added, using the master disk with the master-disk identification information added, the first disk device obtains, after the first disk with the master-disk identification information added is mounted, the first correction information from the correction-information storing device based on the master-disk identification information of the first disk, and the specific information is recorded in a system area in which information for controlling the first disk device is recorded on the first disk.

16. The disk device correcting system according to claim 15, further comprising:

a second disk device that includes a second disk produced from a master disk that is common to the first disk, wherein the first correction information is second correction information for correcting a servo signal of the second disk measured by the second disk device.

17. The disk device correcting system according to claim 15, further comprising:

the first correction information includes information for correcting a rotation synchronization component of a positional difference on the track when reading out the servo signal.

18. The disk device correcting system according to claim 15, wherein the specific information is recorded on a same line across a plurality of tracks on the first disk in a radial direction of the first disk.

19. The disk device correcting system according to claim 15, wherein the specific information is recorded with a bit length longer than the servo signal on the track on the first disk.

20. The disk device correcting system according to claim 15, wherein the specific information is recorded repeatedly a plurality of times in a direction of the track on the first disk.

* * * * *